United States Patent
Asahi

(10) Patent No.: US 6,704,508 B1
(45) Date of Patent: Mar. 9, 2004

(54) OPTICAL CROSSCONNECT, OPTICAL NETWORK DEVICE, AND CONNECTION STATUS SUPERVISORY METHOD

(75) Inventor: Koji Asahi, Tokyo (JP)

(73) Assignee: NEC Corporation, Tokyo (JP)

( * ) Notice: Subject to any disclaimer, the term of this patent is extended or adjusted under 35 U.S.C. 154(b) by 631 days.

(21) Appl. No.: 09/595,345

(22) Filed: Jun. 15, 2000

(30) Foreign Application Priority Data

Jun. 16, 1999 (JP) .......................................... 11/169226

(51) Int. Cl.⁷ .......................... H04B 10/08; H04J 14/00
(52) U.S. Cl. ............................. 398/30; 398/12; 398/16; 398/19; 398/25; 398/31; 398/33; 398/45; 398/50
(58) Field of Search ................................ 359/117, 128, 359/139; 398/30, 12, 19, 31, 45, 50, 16

(56) References Cited

U.S. PATENT DOCUMENTS

| | | | | |
|---|---|---|---|---|
| 5,181,134 A | * | 1/1993 | Fatehi et al. | 359/117 |
| 5,625,481 A | * | 4/1997 | Tamura et al. | 359/179 |
| 6,046,833 A | * | 4/2000 | Sharma et al. | 359/119 |
| 6,163,633 A | * | 12/2000 | Ueda | 385/16 |

FOREIGN PATENT DOCUMENTS

| | | |
|---|---|---|
| JP | 55-97753 | 7/1980 |
| JP | 58-71740 | 4/1983 |
| JP | 2-66048 | 5/1990 |
| JP | 3-192928 | 8/1991 |
| JP | 8-181665 | 7/1996 |
| JP | 9-27975 | 1/1997 |
| JP | 163413 | 6/1997 |
| JP | 10-65624 | 3/1998 |
| JP | 10-163966 | 6/1998 |
| JP | 10-178389 | 6/1998 |

OTHER PUBLICATIONS

S. Okamoto, et al., "Inter–Network Interface for Photonic Transport Networks and SDH Transport Networks", *Globecom '97 papers*, 24.1, Phoenix, Arizona, Nov. 1997, pp. 850–855.

Y. Hamazumi, et al., "Supervising of Optical Path Utilizing Pilot Tones in Optical Path Transport Network", *Technical Report of IEICE*, OCS96–66, 1996, pp. 45–52.

"Wavelength Division Multiplexing", *The First Ever European Meeting Place for WDM Systems, Network, Marketing & Engineering Professionals*, Nov. 1997, London, pp. 18–23.

Copy of Japanese Office Action dated Apr. 1, 2003 (and English translation of relevant portion).

* cited by examiner

Primary Examiner—Jason Chan
Assistant Examiner—M. R. Sedighian
(74) Attorney, Agent, or Firm—Dickstein, Shapiro, Morin & Oshinsky, LLP.

(57) ABSTRACT

An optical crossconnect selectively connects at least one input terminal with at least one output terminal. The optical crossconnect includes: an optical switch connecting at least one input port connected to the at least one input terminal with at least one output port connected to the at least one output terminal; at least one supervisory light generating circuit for sending a supervisory light from each of the at least one output port to the optical switch; and at least one supervisory light receiving circuit for receiving the supervisory light output from the at least one input port.

10 Claims, 24 Drawing Sheets

OPTICAL MODULATION FUNCTION

OPTICAL RE-GENERATION FUNCTION

Fig. 8
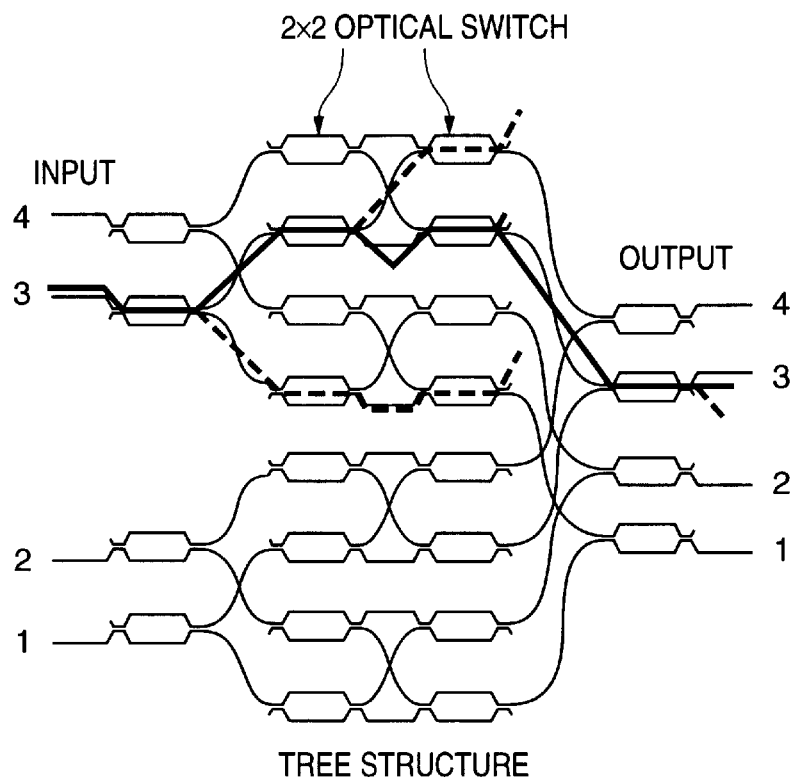
TREE STRUCTURE
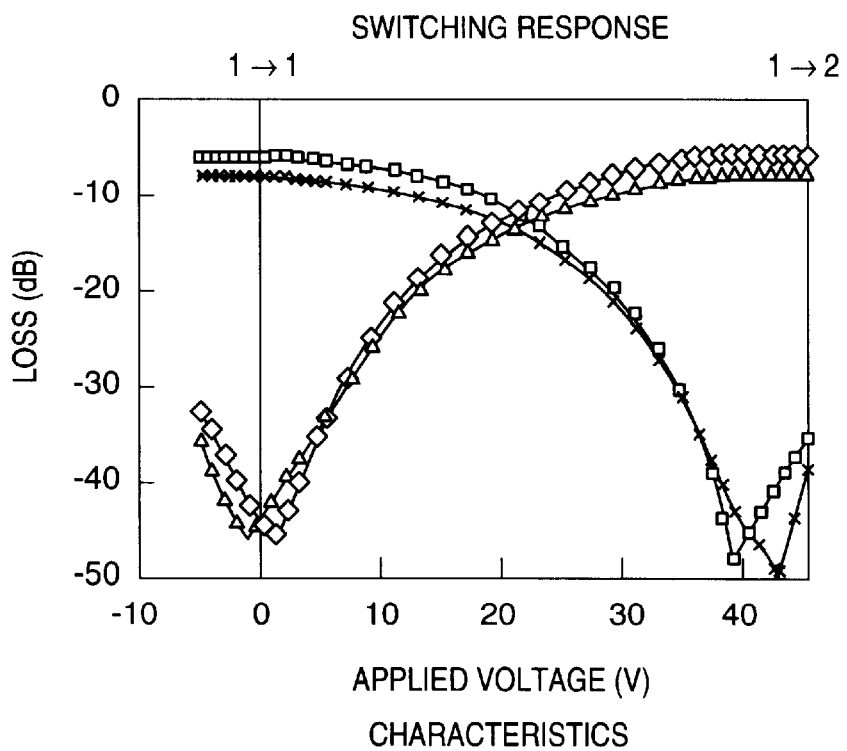
CHARACTERISTICS

TREE STRUCTURE

OPTICAL CROSSCONNECT, OPTICAL NETWORK DEVICE, AND CONNECTION STATUS SUPERVISORY METHOD

BACKGROUND OF THE INVENTION

1. Field of the Invention

The present invention relates to an optical crossconnect that uses an optical switch to set optical signal paths, an optical network device, and a connection status supervisory method. More particularly, the present invention relates to an optical crossconnect capable of supervising optical signal paths set in the optical crossconnect without affecting the service signal, an optical network device, and a connection status supervisory method.

2. Description of the Related Art

An optical crossconnect system, which uses an optical switch, can process a large number of optical signals because it can switch signals regardless of their formats. The introduction of Wavelength-Division Multiplexing (WDM) technology allows the optical crossconnect to process and switch an even larger number of optical signals. Because this technology makes signal-path setting easier and protection more efficient, much effort has been made at the research and development of this field. This is described in detail, for example, in "Examining an integrated solution to optical transport networking.", Wavelength Division Multiplexing: (The first ever European meeting place for WDM Systems, Network, Marketing & Engineering Professionals), pp. 18–23, November 1997, London.

Conventionally, several methods for supervising optical paths in an optical crossconnect have been studied. For example, the supervisory signal is superimposed over the service signal. This method is described, for example, in "A study of the method for supervising optical paths using the pilot tone signal in an optical path network" by Hamazumi et. al., pp. 45–52, in Technical Report of IEICE, OCS96-66 or in "Inter-Network interface for photonic transport networks and SDH transport network" by Satoru Okamoto et. al., pp. 850–855, in GLOBECOM'97 paperS24.1, Phoenix Ariz. November 1997.

Conventionally, the supervision of the optical paths of an optical crossconnect has been done in one of the methods described below. In the first method, the input signal of the optical crossconnect is modulated, and the power of this signal is supervised at the output of the optical crossconnect. When the magnitude of the signal is abnormal, the corresponding optical path is assumed to be abnormal. In the second method, the power of the input signal of the optical crossconnect is compared with that of the output signal. When the optical power has been attenuated significantly, the corresponding optical path is assumed to be abnormal.

However, in the optical crossconnect in accordance with the first method, the input signal is modulated and therefore the optical signal output from the optical crossconnect is also modulated. This modulation affects the quality of the optical signal.

In the optical crossconnect in accordance with the second method, the loss of the optical switch can be supervised but the service signal cannot be identified. Therefore, this method is not appropriate for supervising whether or not the optical paths are normal.

SUMMARY OF THE INVENTION

The present invention seeks to solve the problems associated with the prior art described above. It is an object of the present invention to provide an optical crossconnect, an optical network device, and a connection status supervisory method that can supervise, without affecting the service signal, the optical signal paths that are set in the optical crossconnect.

The optical crossconnect according to the present invention is an optical crossconnect selectively connecting at least one input terminal with at least one output terminal, the optical crossconnect comprising an optical switch connecting at least one input port connected to the at least one input terminal with at least one output port connected to the at least one output terminal; at least one supervisory light generating circuit for sending a supervisory light from each of the at least one output port to the optical switch; and at least one supervisory light receiving circuit for receiving the supervisory light output from the at least one input port.

An optical network device according to the present invention is an optical network device transferring optical signals among a plurality of optical node devices interconnected via optical transmission lines, wherein each of the plurality of optical node devices comprises the optical crossconnect described above.

A connection status supervisory method according to the present invention is a connection status supervisory method for supervising a connection status of an optical crossconnect, the connection status supervisory method comprising the steps of generating a supervisory light to supply it to each of output ports of the optical crossconnect, the supervisory light being superimposed over by a signal that is unique; receiving the supervisory light output from each of input ports of the optical crossconnect; and determining whether or not an optical path is normal by referencing the signal superimposed over the supervisory light received in the step of receiving the supervisory light.

BRIEF DESCRIPTION OF THE DRAWINGS

The above and other objects, features and advantages of the present invention will become more apparent from the following detailed description when taken in conjunction with the accompanying drawings wherein:

FIG. 4 is a diagram showing the configuration of a supervisory signal superimposing circuit.

FIG. 8 is a diagram showing an example of the configuration of a 4×4 optical switch;

DETAILED DESCRIPTION OF THE PREFERRED EMBODIMENTS

Before describing an optical crossconnect, an optical network device, and a connection status supervisory method according to the present invention, conventional optical crossconnects will be described to help understand the present invention.

Figure 1:
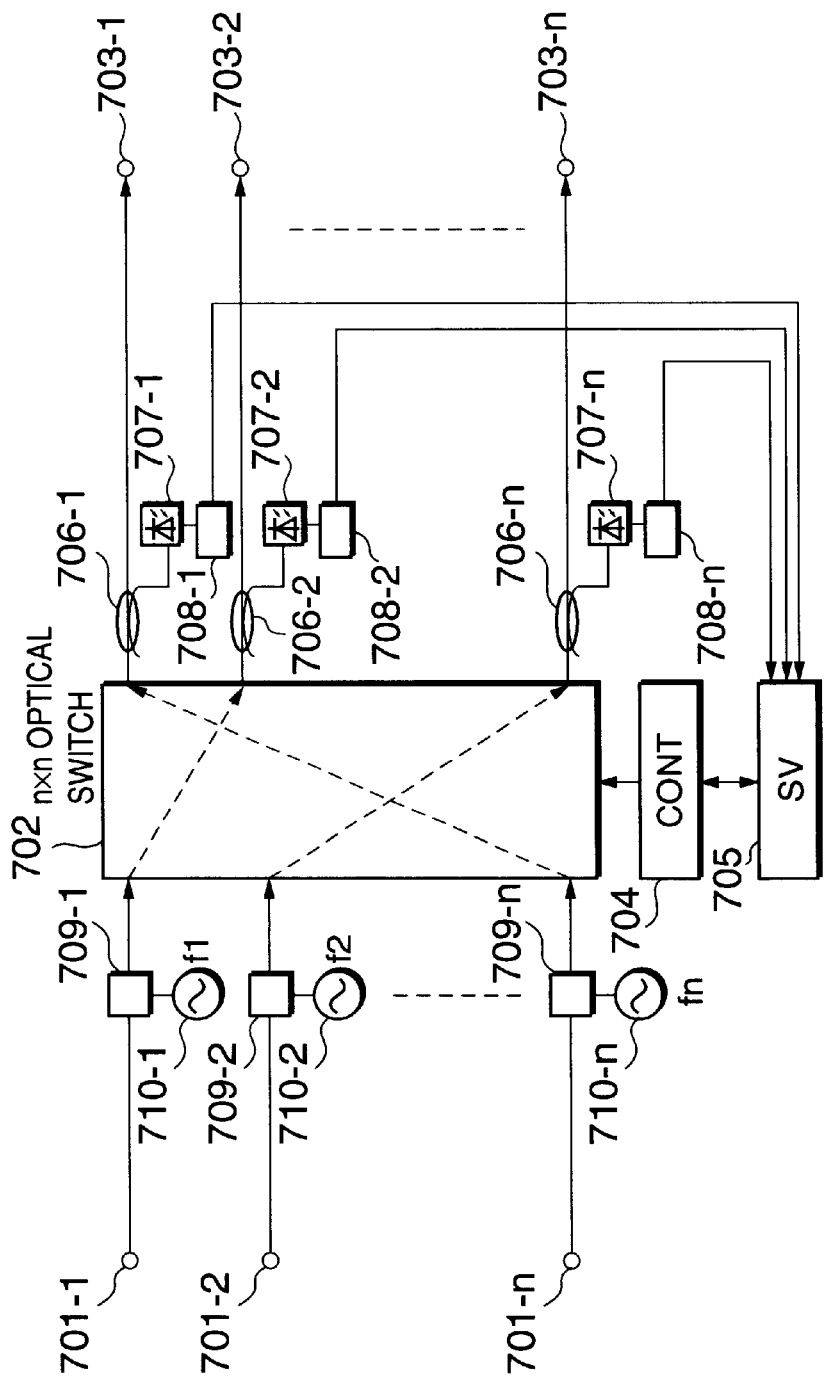
FIG. 1 is a diagram showing the configuration of an optical crossconnect according to a first prior art.

FIG. 1 shows an example of the configuration of a conventional optical crossconnect.

FIG. 1 shows an example of an optical crossconnect according to a first prior art. The optical crossconnect shown in FIG. 1 comprises optical signal input terminals 701-1–701-n, an n×n optical switch 702, optical signal output terminals 703-1–703-n, optical path control means 704, optical path supervisory means 705, optical couplers 706-1–706-n, photo-diodes 707-1–707-n, supervisory signal detecting means 708-1–708-n, supervisory signal superimposing circuits 709-1–709-n, and supervisory signal generating means 710-1 –710-n.

In FIG. 1, optical signals received by the optical signal input terminals 701-1–701-n are sent to the n×n optical switch 702 via the supervisory signal superimposing circuits 709-1–709-n respectively. Normally, the n×n optical switch 702 selectively connects n input ports to n output ports in any combination in response to the control signal from the optical path control means 704, and outputs the optical signals supplied to the input ports to the output ports. N output signals from the n×n optical switch 702 are output to the optical signal output terminals 703-1–703-n via the optical couplers 706-1–706-n respectively. That is, an optical signal received by the optical signal input terminals 701-1–701-n may be output to any desired terminal out of the optical signal output terminals 703-1–703-n via one of the paths that are set by the n×n optical switch 702.

Figure 2:
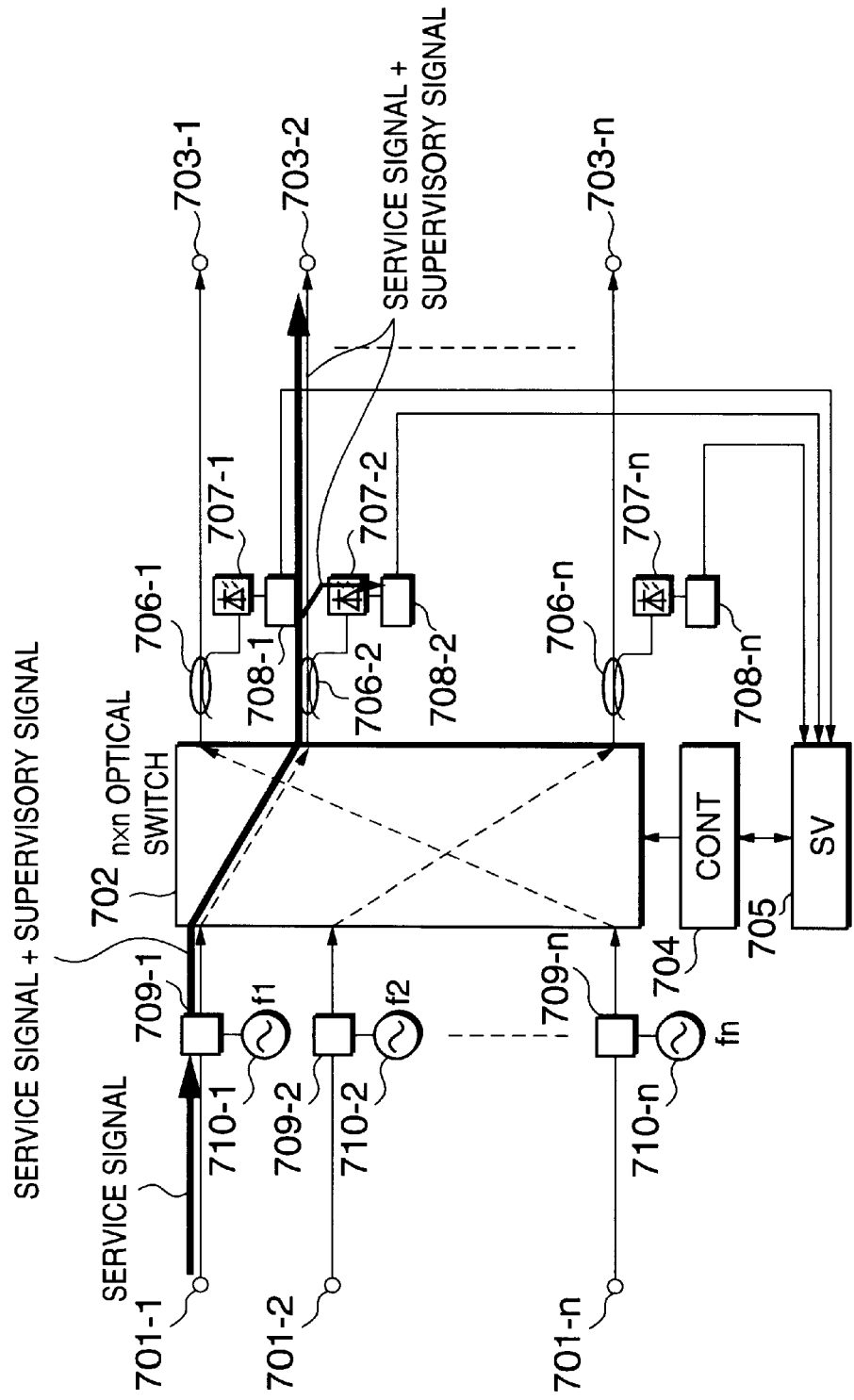
FIG. 2 is a diagram showing the supervisory operation of the first prior art.
Figure 3:
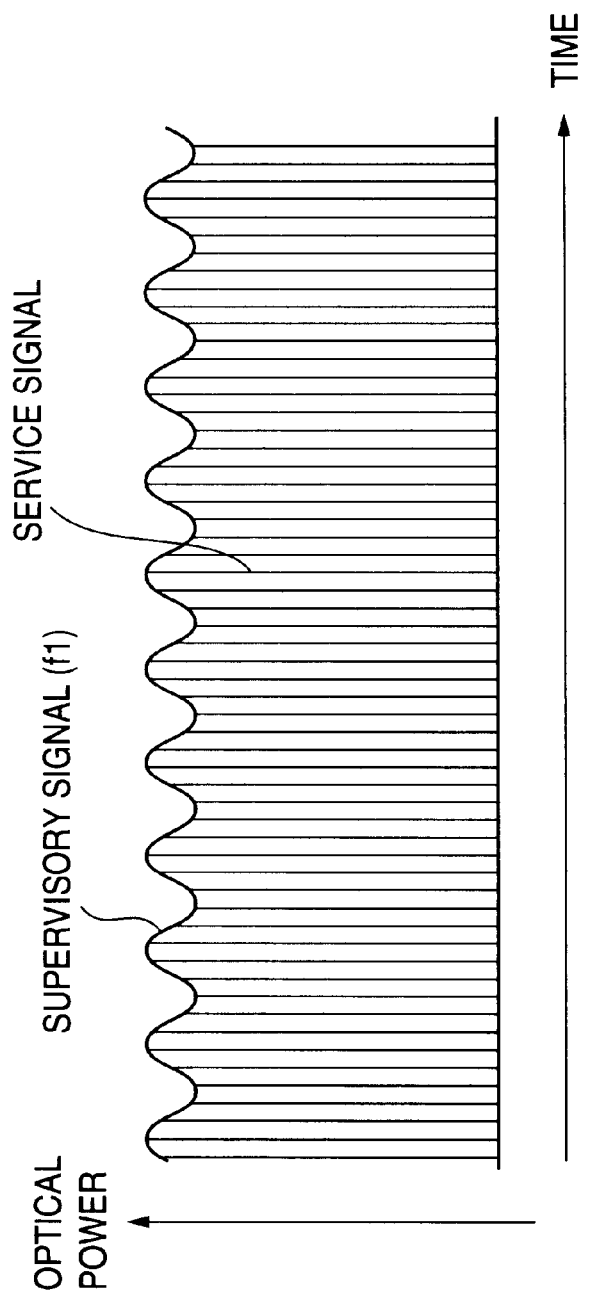
FIG. 3 is a diagram showing an example of waveform of the supervisory signal superimposed over the service signal.

Next, optical path supervision performed by this optical crossconnect will be described with reference to FIG. 2. FIG. 2 shows how the n×n optical switch 702, shown in FIG. 1, is set up to allow the service signal received at the optical signal input terminal 701-1 to be output to the optical signal output terminal 703-2. In FIG. 2, the service signal is intensity-modulated by the supervisory signal f1 in the supervisory signal superimposing circuits 709-1. FIG. 3 shows the service signal over which the supervisory signal f1 has been superimposed.

FIG. 4 shows an example of the supervisory signal superimposing circuit. The supervisory signal superimposing circuit comprises an optical signal input terminal 801, an optical modulator 802, an optical signal output terminal 803, a supervisory signal input terminal 804, an optical signal input terminal 811, opto-electric conversion means 812, electric-photo conversion means 813, an optical signal output terminal 814, and a supervisory signal input terminal 815.

Figure 4A:
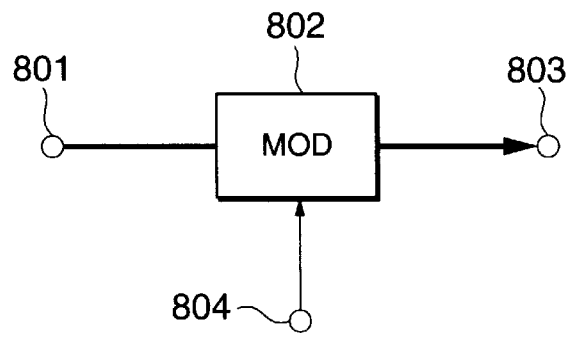
FIG. 4(a) is a diagram showing the configuration in which an optical demodulator is used.
Figure 4B:
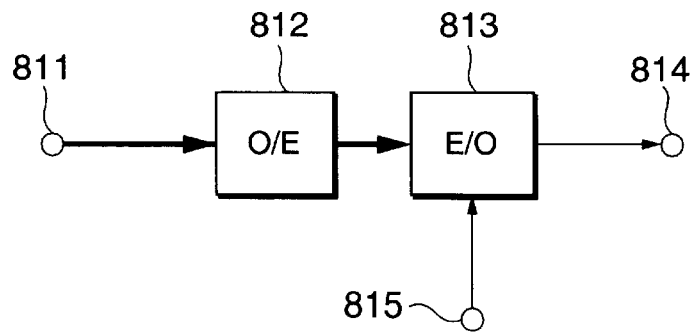
FIG. 4(b) is a diagram showing the configuration in which an input optical signal is converted to an electric signal.

The function shown in FIG. 4(a) uses the optical modulator to amplitude-modulate the received optical signal using the supervisory signal. The function shown in FIG. 4(b) converts the received optical signal to the electric signal and, when the electric signal is reproduced back to the optical signal, converts the service signal, over which the supervisory signal is superimposed, back to the optical signal. As a result, both the function shown in FIG. 4(a) and the function shown in FIG. 4(b) give the service signal over which the supervisory signal is superimposed. The optical waveform is shown in FIG. 3.

Then, the service signal, over which the supervisory signal is superimposed, passes through the n×n optical switch 702. At the optical coupler 706-2, a part of the service signal branches off into the photo-diode 707-2. The supervisory signal detecting means 708-2 extracts the supervisory signal with the frequency of f1 from the optical current in the photo-diode 707-2 and sends the extracted supervisory signal to the optical path supervisory means 705. The optical path supervisory means 705 checks the frequency and the level of the signal detected as the supervisory signal to identify the path through which the optical signal has actually passed as well as the loss. Then, the optical path supervisory means 705 determines whether or not the optical path that is set by the optical path control means 704 is operating normally.

The optical crossconnect according to the first prior art, with the configuration described above, has means for superimposing the supervisory signal over the service signal. However, because the supervisory signal remains superimposed over the service signal output from the optical crossconnect, the quality of the service signal is affected.

Figure 5:
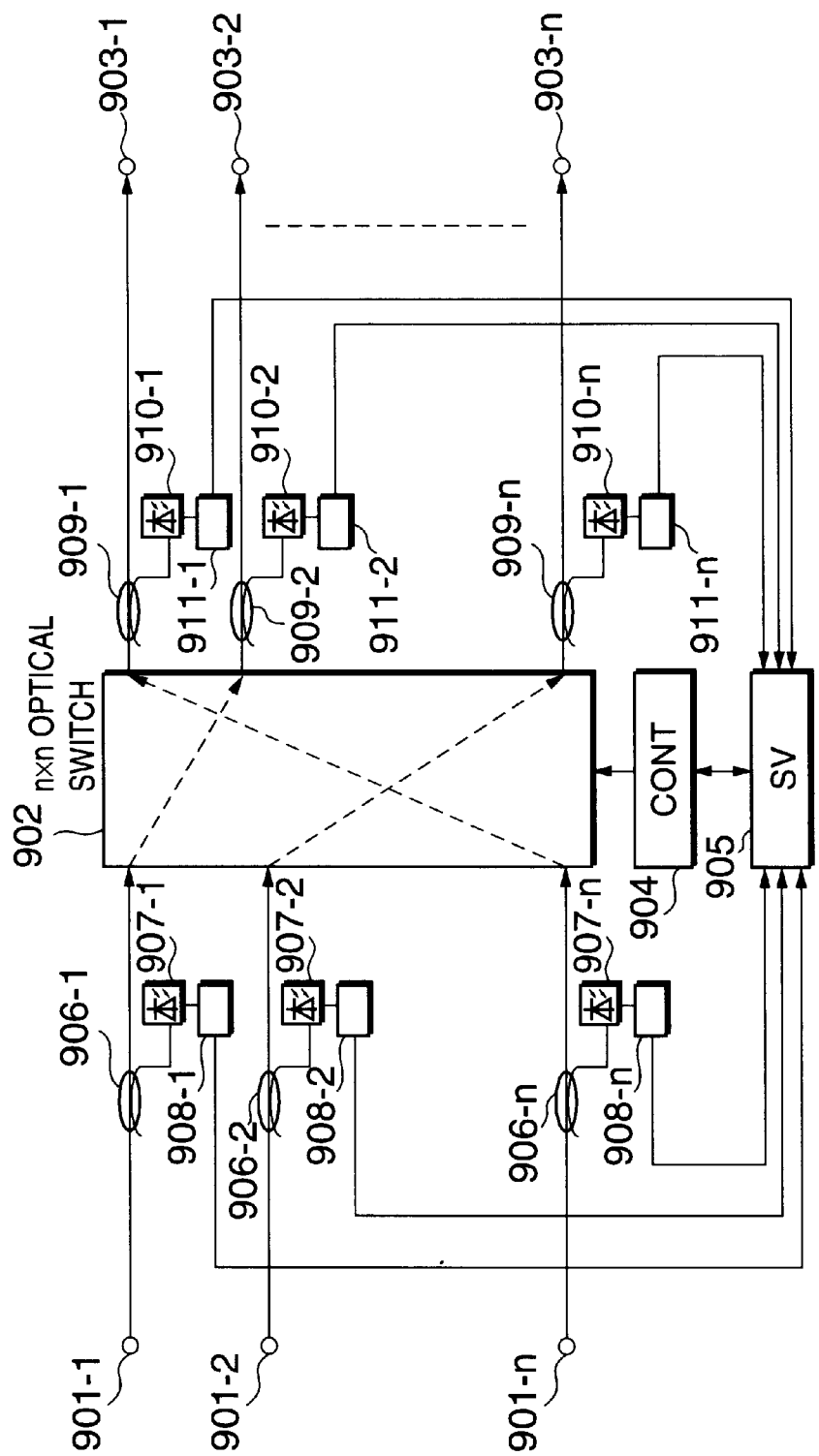
FIG. 5 is a diagram showing the configuration of an optical crossconnect according to a second prior art.

On the other hand, another configuration, shown in FIG. 5, has been proposed as a supervision method that does not affect the service signal. The optical crossconnect shown in FIG. 5 comprises optical signal input terminals 901-1–901-n, an n×n optical switch 902, optical signal output terminals 903-1–903-n, optical path control means 904, optical path supervisory means 905, optical couplers 906-1–906-n, photo-diodes 907-1–907-n, signal detecting means 908-1–908-n, optical couplers 909-1–909-n, photo-diodes 910-1–910-n, and signal detecting means 911-1–911-n.

The optical crossconnect shown in FIG. 5 has means for branching a part of the service signal at the input and the output of the n×n optical switch 902. With these means, the optical crossconnect supervises the service signal level and thereby the connection paths of the optical switch.

However, the optical crossconnect according to the prior art described above can monitor the loss of the optical switch but cannot identify the service signal. Therefore, this optical crossconnect is not suitable for determining that the optical paths are correct.

Next, the configuration and the operation of the optical crossconnect according to the present invention will be described with reference to FIGS. 6–13.

First embodiment

Figure 6:
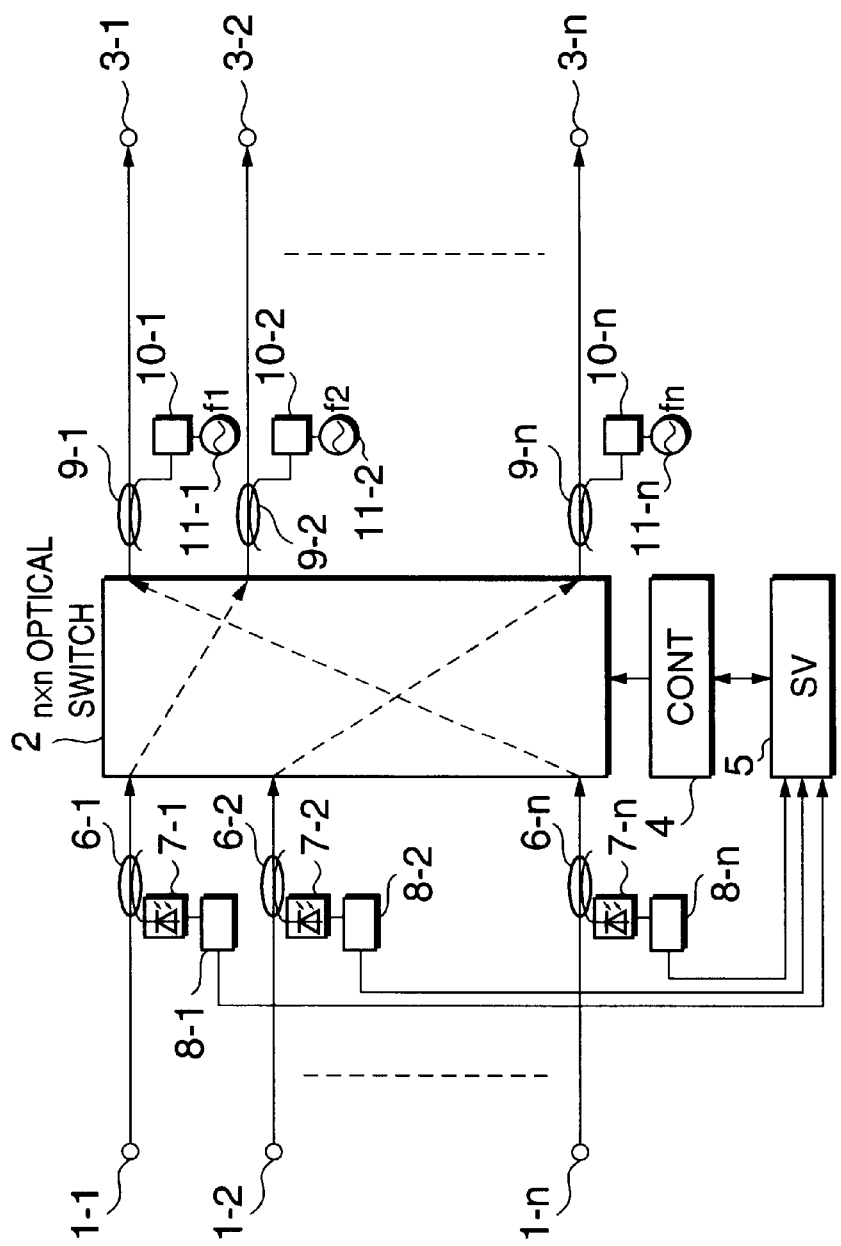
FIG. 6 is a diagram showing the configuration of an optical crossconnect in a first embodiment of the present invention.

FIG. 6 shows the configuration of an optical crossconnect in a first embodiment of the present invention. The optical crossconnect shown in FIG. 6 comprises optical signal input terminals 1-1–1-n, an n×n optical switch 2, optical signal output terminals 3-1–3-n, optical path control means 4, optical path supervisory means 5, optical couplers 6-1–6-n, photo-diodes 7-1–7-n, supervisory signal detecting means 8-1–8-n, optical couplers 9-1–9-n, optical reflector 10-1–10-n, and supervisory signal generating means 11-1–11-n.

Optical signals received by the optical signal input terminals 1-1–1-n of the optical crossconnect shown in FIG. 6 are sent to the n×n optical switch 2 via the optical couplers 6-1–6-n, respectively. Normally, the n×n optical switch 2 selectively connects n input ports with n output ports, in response to the control signal from the optical path control means 4, to output the optical signals supplied to the input ports. The n output signals from the n×n optical switch 2 are output to the optical signal output terminals 3-1–3-n via the optical couplers 9-1–9-n, respectively. That is, an optical signal received by one of the optical signal input terminals 1-1–1-n may be output to any desired terminal of the optical signal output terminals 3-1–3-n via a path that is set in the n×n optical switch 2.

Figure 7:
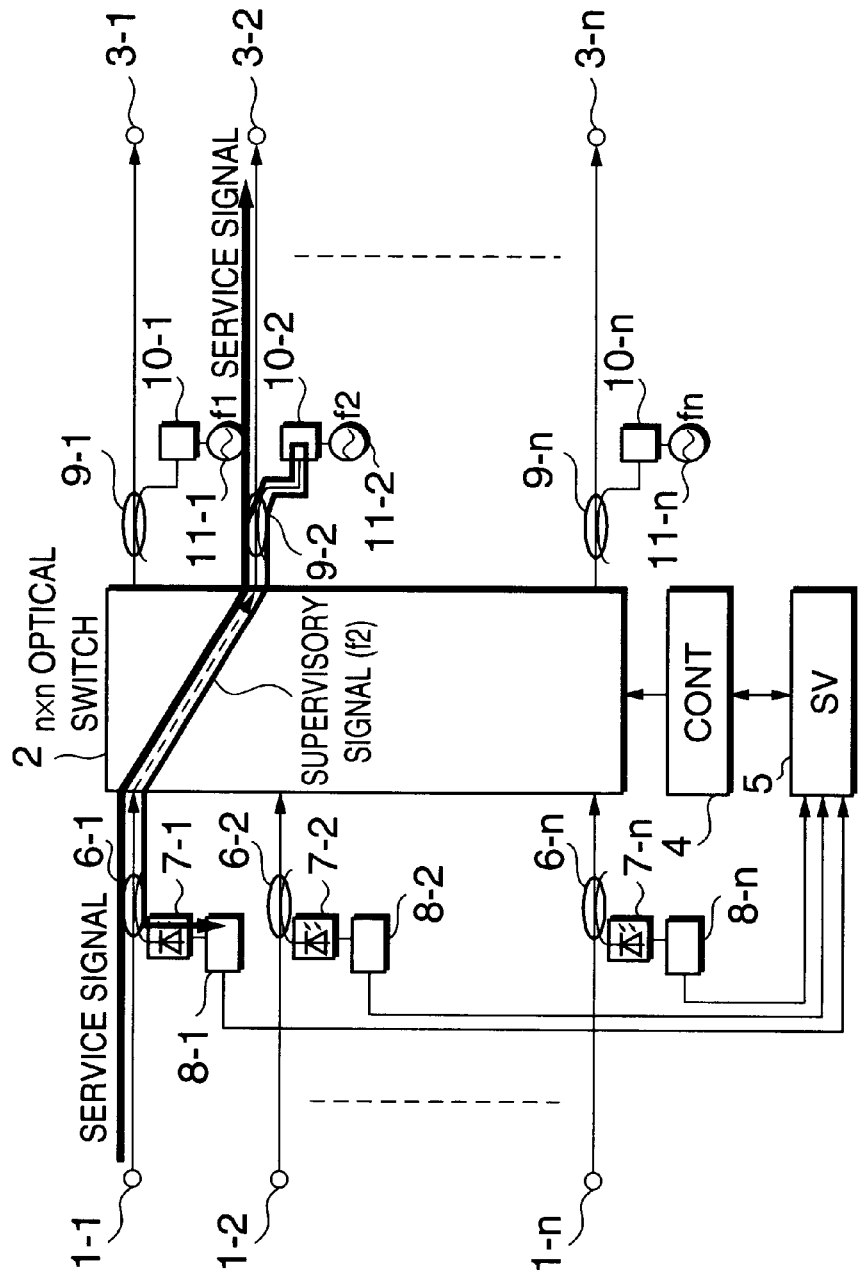
FIG. 7 is a diagram showing the supervisory operation of the first embodiment.

Next, referring to FIG. 7, the operation of the optical crossconnect in this embodiment will be described. FIG. 7 shows the operation that is performed when the optical path is set so that the service signal received by the input terminal 1-1 is output to the output terminal 3-2 by the n×n optical switch 2 in the embodiment shown in FIG. 6.

In FIG. 7, a part of the service signal is branched at the optical coupler 9-2 into the optical reflector 10-2. The optical reflector 10-2 changes the reflectivity of the received optical signal according to the signal (signal with frequency of f2 shown in FIG. 7) received from the supervisory signal generating means 11-2. The optical signal, which will be sent back to the optical coupler 9-2, is intensity-modulated by the frequency of f2. The modulated signal is then sent to the photo-diode 7-1 via the n×n optical switch 2 and the optical coupler 6-1 as the supervisory signal. The supervisory signal detecting means 8-1 extracts the supervisory signal with the frequency of f2 from the optical current of the photo-diode 7-1 and sends the extracted supervisory signal to the optical path supervisory means 5. The optical path supervisory means 5 checks the frequency and the level of the signal detected as the supervisory signal to identify the path through which the optical signal has actually passed as well as the loss. Then, the optical path supervisory means 5 determines whether or not the optical path that is set by the optical path control means 4 is operating properly.

The optical crossconnect performs the operation described above to supervise that an optical path that is set in the optical crossconnect is normal. When an abnormal condition is detected, the optical crossconnect informs the operator of the condition or sends the optical signal to some other path.

In this embodiment, when the service signal is already optically intensity-modulated, the supervisory signal f2 should be set to about one thousandth of the service signal frequency or the bit rate to avoid an interference with the service signal.

The n×n optical switch 2 used in the embodiment is implemented by generating switching devices, each having optical waveguides, 2-inputs/2-outputs, and so on, on a substrate of $LiNbO_3$ (lithium niobate) or quartz.

FIG. 8 shows an example of a 4×4 optical switch fabricated on a $LiNbO_3$ substrate. The optical switch shown in FIG. 8 is composed of 2×2 switches connected by optical waveguides. Combining 2×2 switching devices allows an input optical signal received from one of four input ports to be output to any desired port. FIG. 8 also shows an example of switching characteristics. The switching characteristics shown in this figure indicates that applying voltage to the 2×2 switching devices causes the optical matrix switch to perform switching operation.

Figure 9:
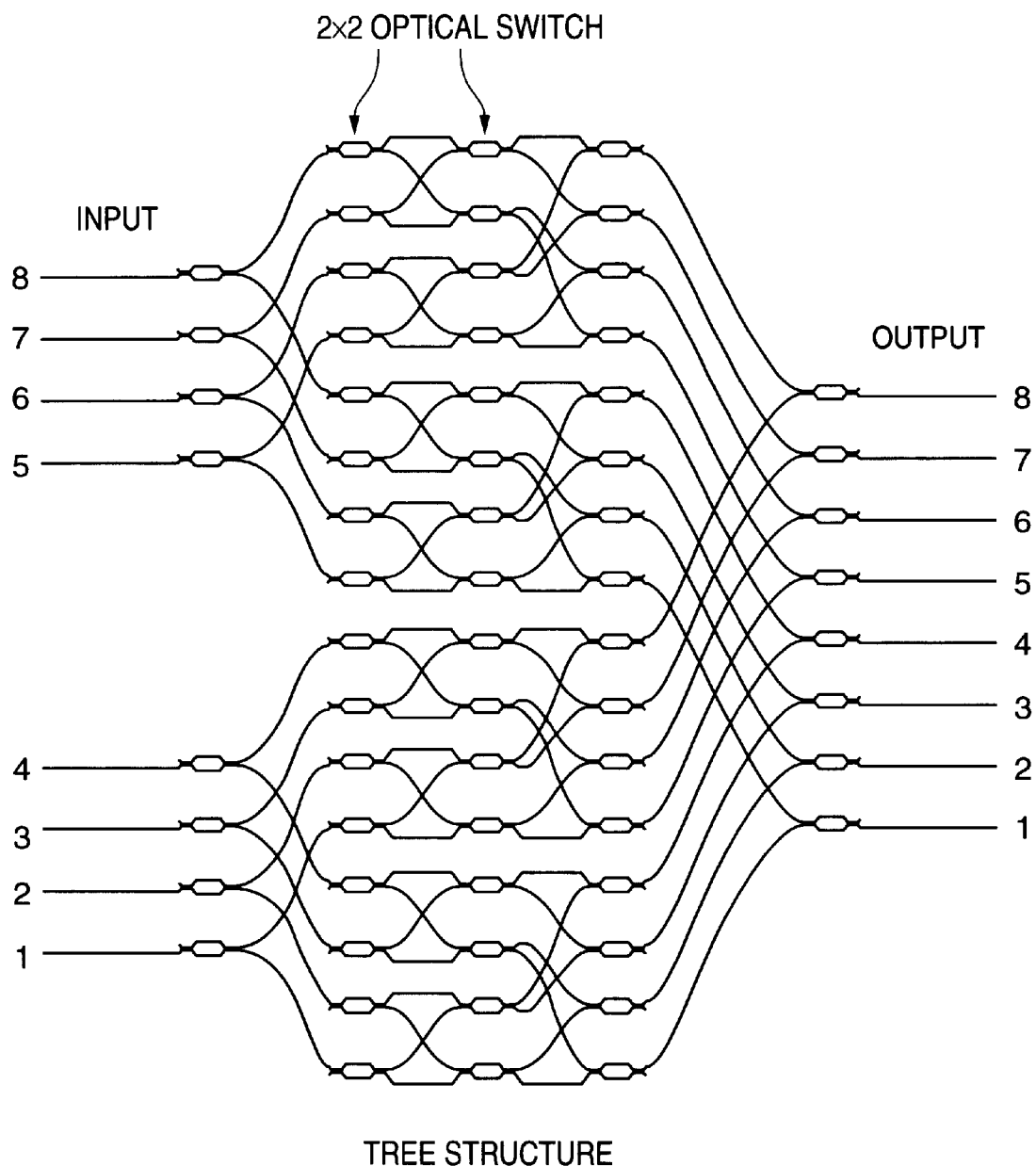
FIG. 9 is a diagram showing an example of the configuration of a 8×8 optical switch.
Figure 10:
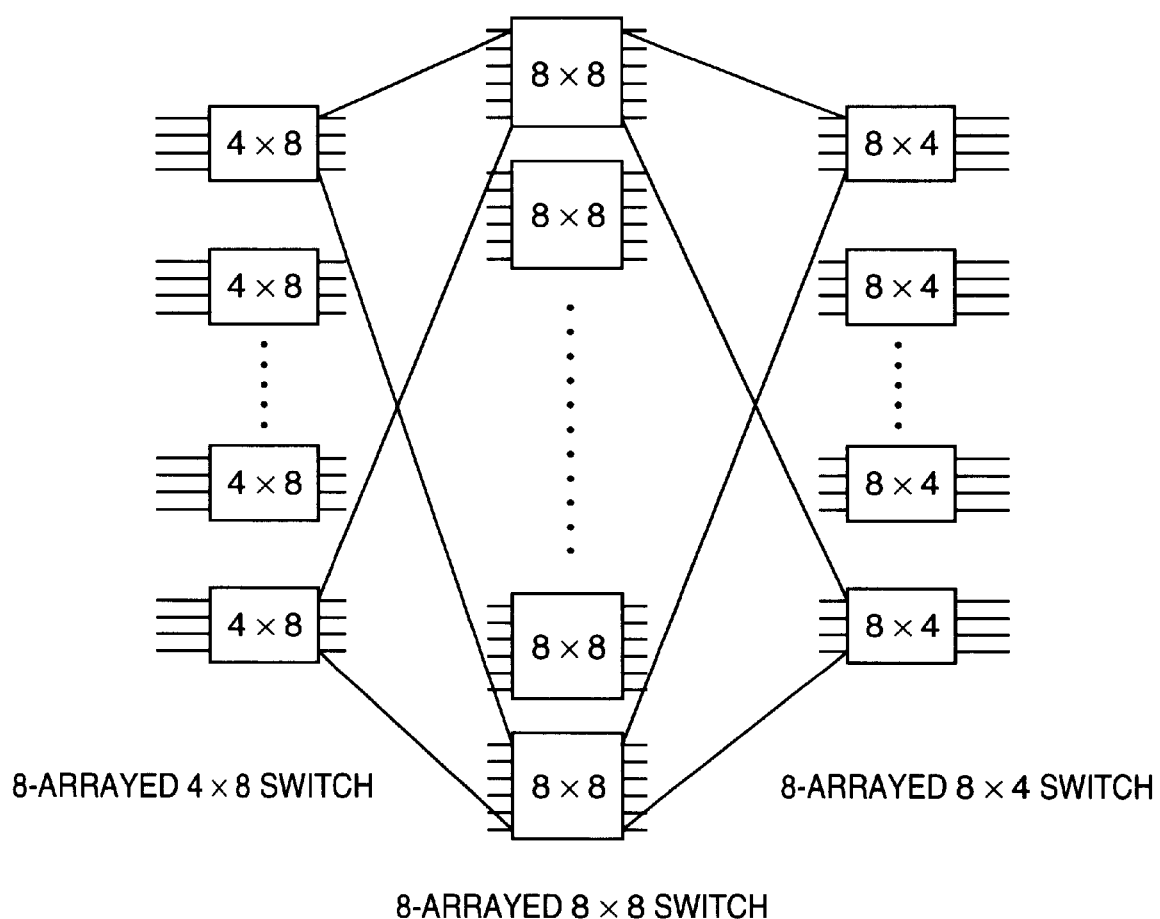
FIG. 10 is a diagram showing an example of the configuration of a 32×32 optical switch.

FIG. 9 shows an example of the configuration of an 8×8 optical switch, while FIG. 10 shows an example of the configuration of a 32×32 optical switch. The principle and the operation are the same as those of the optical switch shown in FIG. 8.

Figure 11:
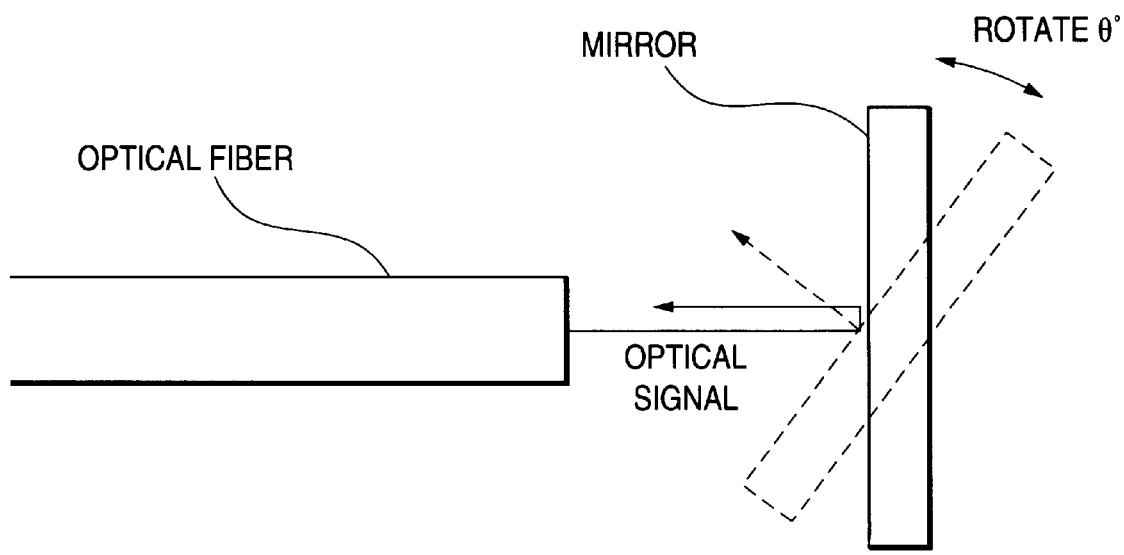
FIG. 11 is a diagram showing an example of the configuration of optical reflector.

FIG. 11 shows an example of the configuration of the optical reflector used in the embodiment. The optical signal sent through the optical fiber reflects on the mirror. The mirror rotation angle θ determines the reflection direction as well as the optical power which will be sent back to the optical fiber. This means that, in this embodiment, rotating the mirror in FIG. 11 according to the supervisory signal frequency allows the optical power, which will be returned to the optical fiber, to be intensity-modulated.

Second Embodiment

Figure 12:
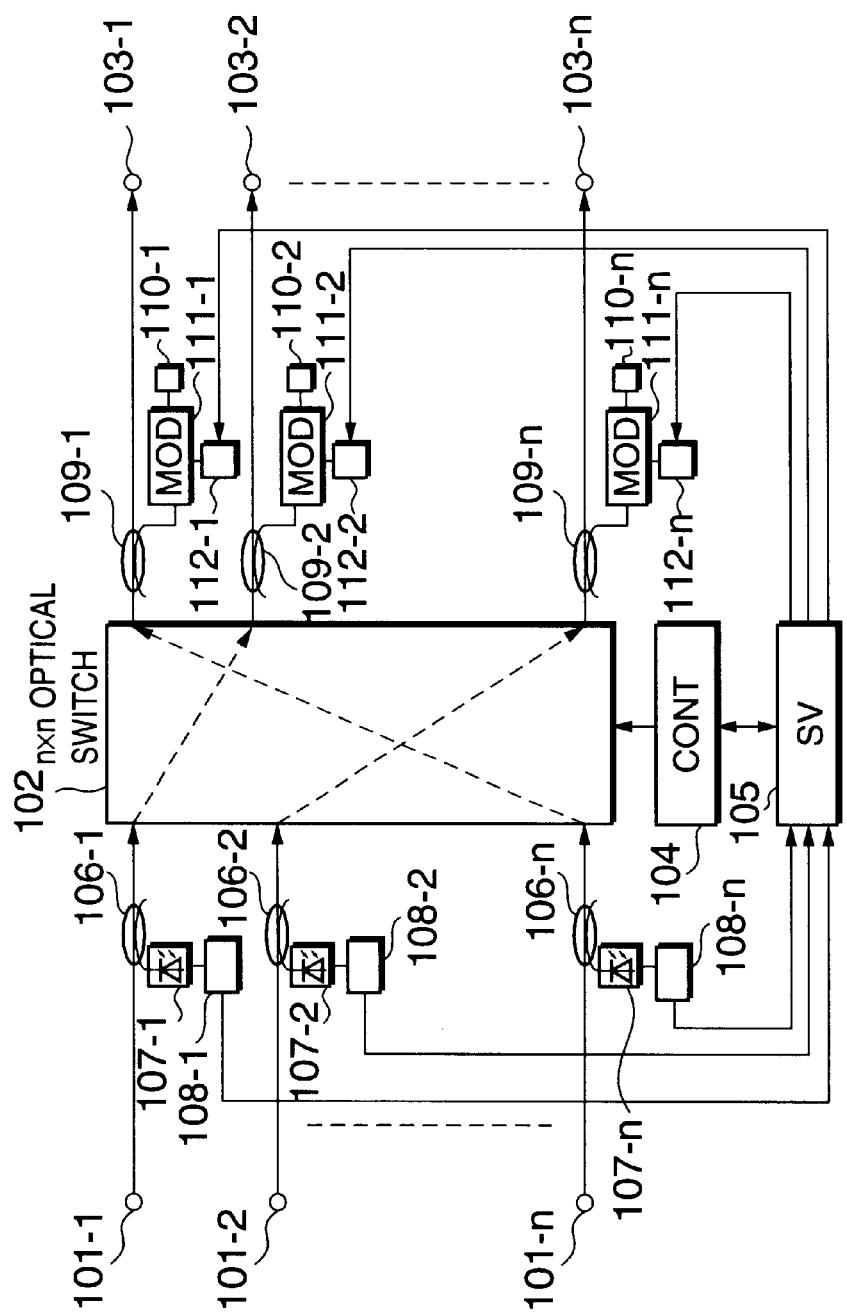
FIG. 12 is a diagram showing the configuration of an optical crossconnect in a second embodiment of the present invention.

FIG. 12 shows the configuration of an optical crossconnect in a second embodiment of the present invention. The optical crossconnect shown in FIG. 12 comprises optical signal input terminals 101-1–101-n, an n×n optical switch 102, optical signal output terminals 103-1–103-n, optical path control means 104, optical path supervisory means 105, optical couplers 106-1–106-n, photo-diodes 107-1–107-n, supervisory signal detecting means 108-1–108-n, optical couplers 109-1–109-n, optical reflector 110-1–110-n, optical modulation means 111-1–111-n, and optical modulator driving means 112-1–112-n.

The optical crossconnect shown in FIG. 12 is similar to the optical crossconnect shown in FIG. 6 except the supervisory signal generating means. The supervisory signal paths in FIG. 12 are the same as those in FIG. 6. However, the supervisory signal is generated by the optical modulation means 111-1–111-n which intensity-modulate the optical signal supplied from the optical couplers 109-1–109-n according to the signal from the optical path supervisory means 105. The supervisory signal detecting means 108-1–108-n demodulate the intensity modulated signals and send them to the optical path supervisory means 105. The optical path supervisory means 105 checks whether the received signal matches the signal that was sent to determine whether the optical path is normal. As described above, a signal, generated by the optical path supervisory means 105 and different from that of any other path that is set, is used in this embodiment as supervisory signal.

Figure 13:
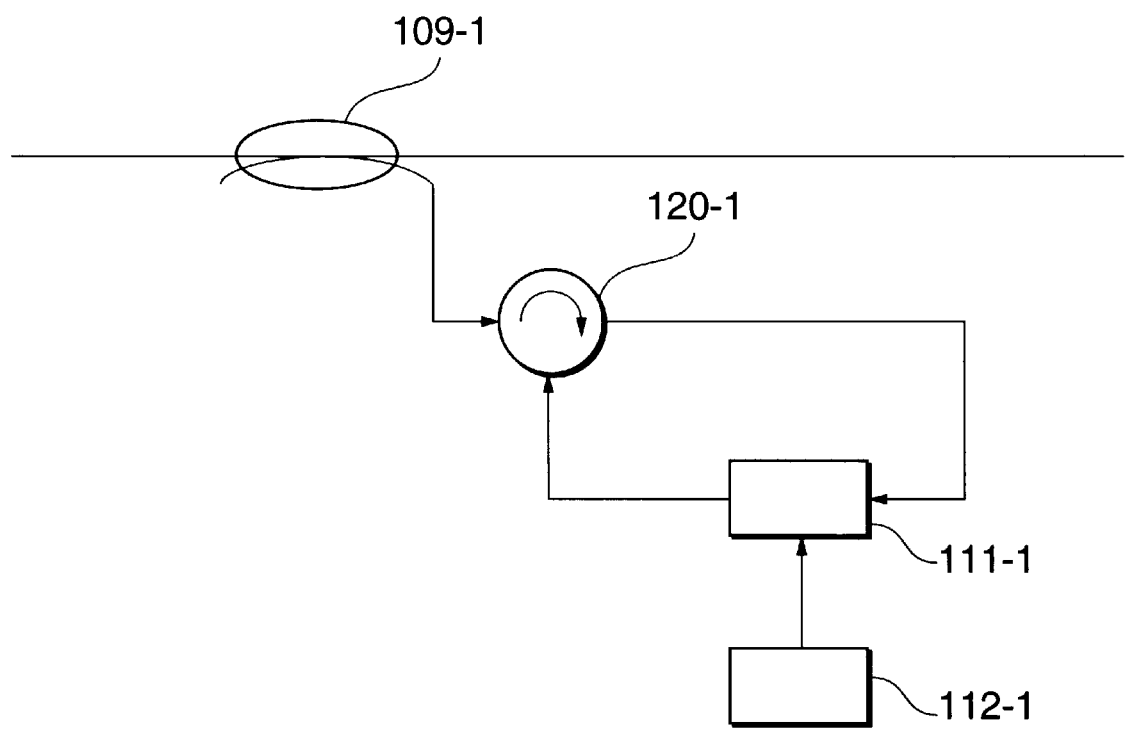
FIG. 13 is a diagram showing another configuration of an optical modulator and other components in the second embodiment.

In this embodiment, the supervisory signal is sent back to the input side of the n×n optical switch 102 using the path via which the optical signal was supplied from the optical coupler 109-1–109-n to the optical modulation means 111-1–111-n. The supervisory signal may be sent back in some other way. For example, optical circulators 120-1–120-n may be used as shown in FIG. 13.

Third embodiment

Figure 14:
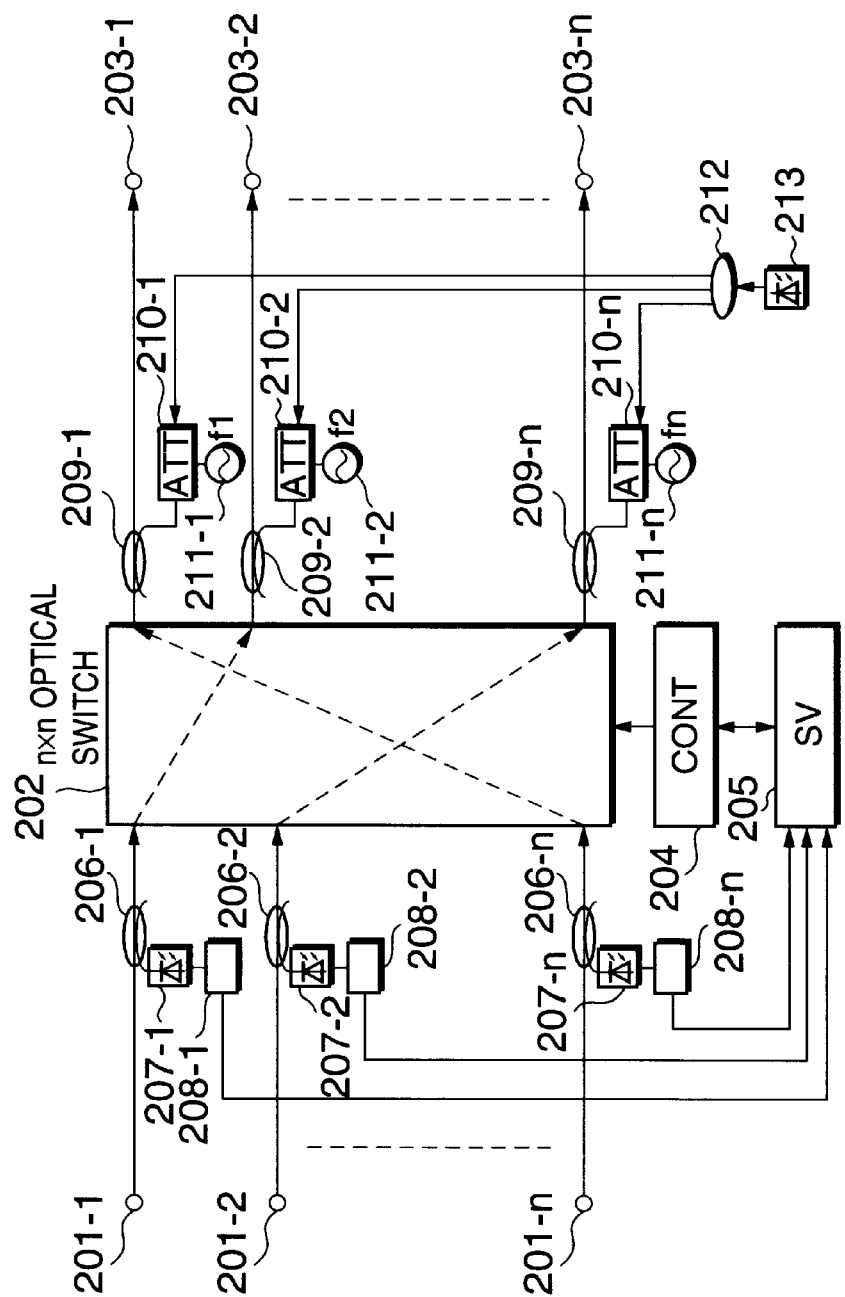
FIG. 14 is a diagram showing the configuration of an optical crossconnect in a third embodiment of the present invention.

FIG. 14 shows the configuration of an optical crossconnect in a third embodiment of the present invention. The optical crossconnect shown in FIG. 14 comprises optical signal input terminals 201-1–201-n, an n×n optical switch 202, optical signal output terminals 203-1–203-n, optical path control means 204, optical path supervisory means 205, optical couplers 206-1–206-n, photo-diodes 207-1–207-n, supervisory signal detecting means 208-1–208-n, optical couplers 2091–209-n, variable optical attenuators 210-1–210-n, supervisory signal generating means 211-1–211-n, a 1:n optical coupler 212, and a supervisory light source 213.

The optical crossconnect in the first embodiment described above generates the supervisory signal by intensity-modulating a part of the service signal, while the optical crossconnect in this embodiment has one supervisory light source 213 for generating the supervisory signal. More specifically, the light output from the supervisory light source 213 is distributed to the variable optical attenuators 210-1–210-n by the 1:n optical coupler 212. Each variable optical attenuator changes the optical attenuation amount by its own supervisory signal generating means 211-1–211-n. As a result, the light from the supervisory light source is intensity-modulated by signals each with one of n different frequencies f1–fn. The intensity-modulated supervisory signal passes through the n×n optical switch 202 in the opposite direction of the service signal. It is sent via the optical coupler 206-1–206-n and then opto-electric converted by the photo-diode 207-1–207-n. The supervisory signal is extracted by the supervisory signal detecting means 208-1–208-n and is sent to the optical path supervisory means 205. The optical path supervisory means 205 checks the frequency and the level of each signal detected as the supervisory signal to identify the path through which the optical signal has actually passed as well as the loss. Then, the optical path supervisory means 205 determines whether or not the optical path that is set by the optical path control means 204 is operating normally.

Figure 15:
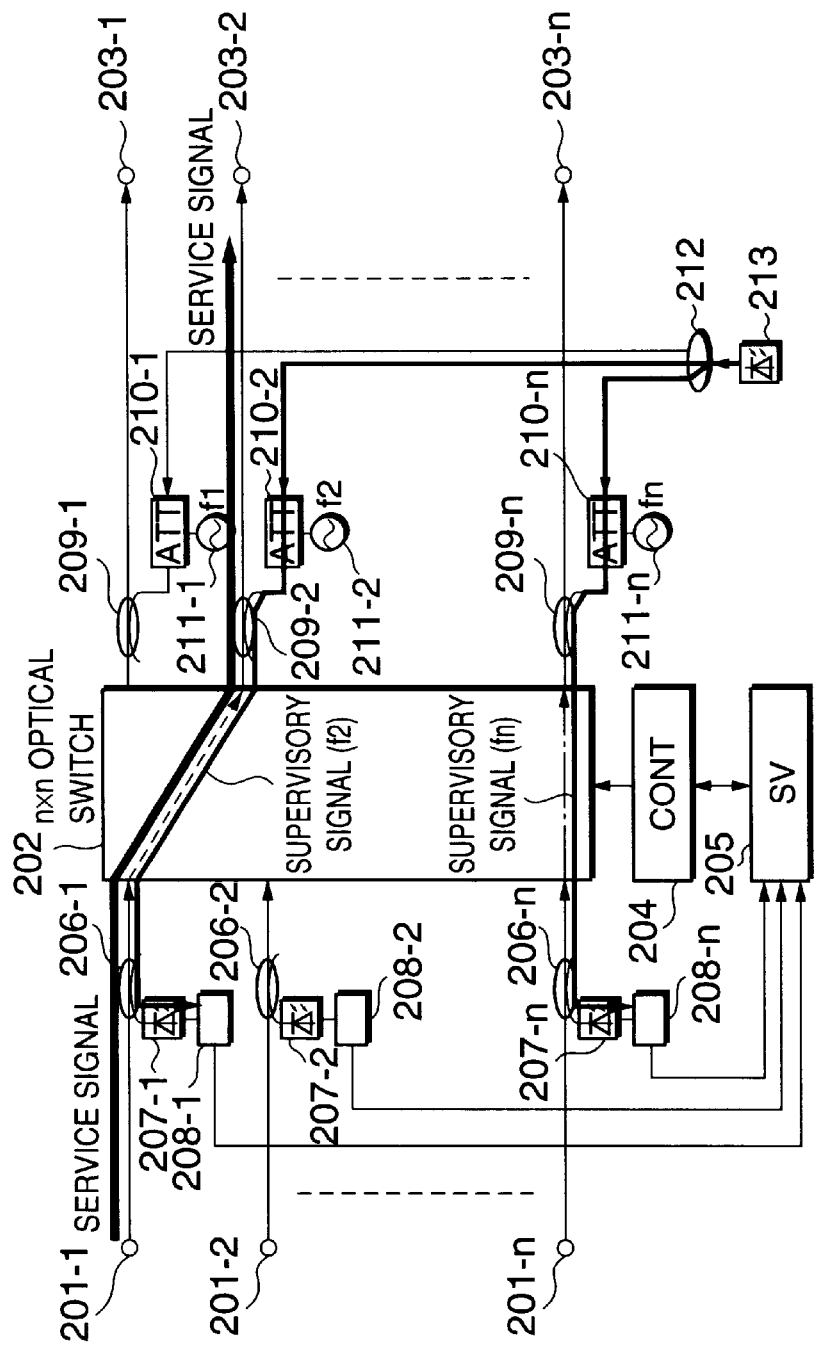
FIG. 15 is a diagram showing the supervisory operation of the third embodiment.

Next, by referring to FIGS. 15 and 16, the supervisory operation in this embodiment will be described. FIG. 15 shows the flow of the service signal and the supervisory signal when the service signal flows from the optical signal input terminal 201-1 to the optical signal output terminal 203-2. Because the supervisory signal (f2) passes through the n×n optical switch 202 in the opposite direction of the service signal, the supervisory signal detecting means 208-1 can receive the signal with the frequency of f2 and check the frequency and the level to check if the optical path is normal. On the other hand, it is also possible to supervise some other path through which no service signal passes (for example, the path "201-n→203-n") and reserve it as a standby path.

Figure 16:
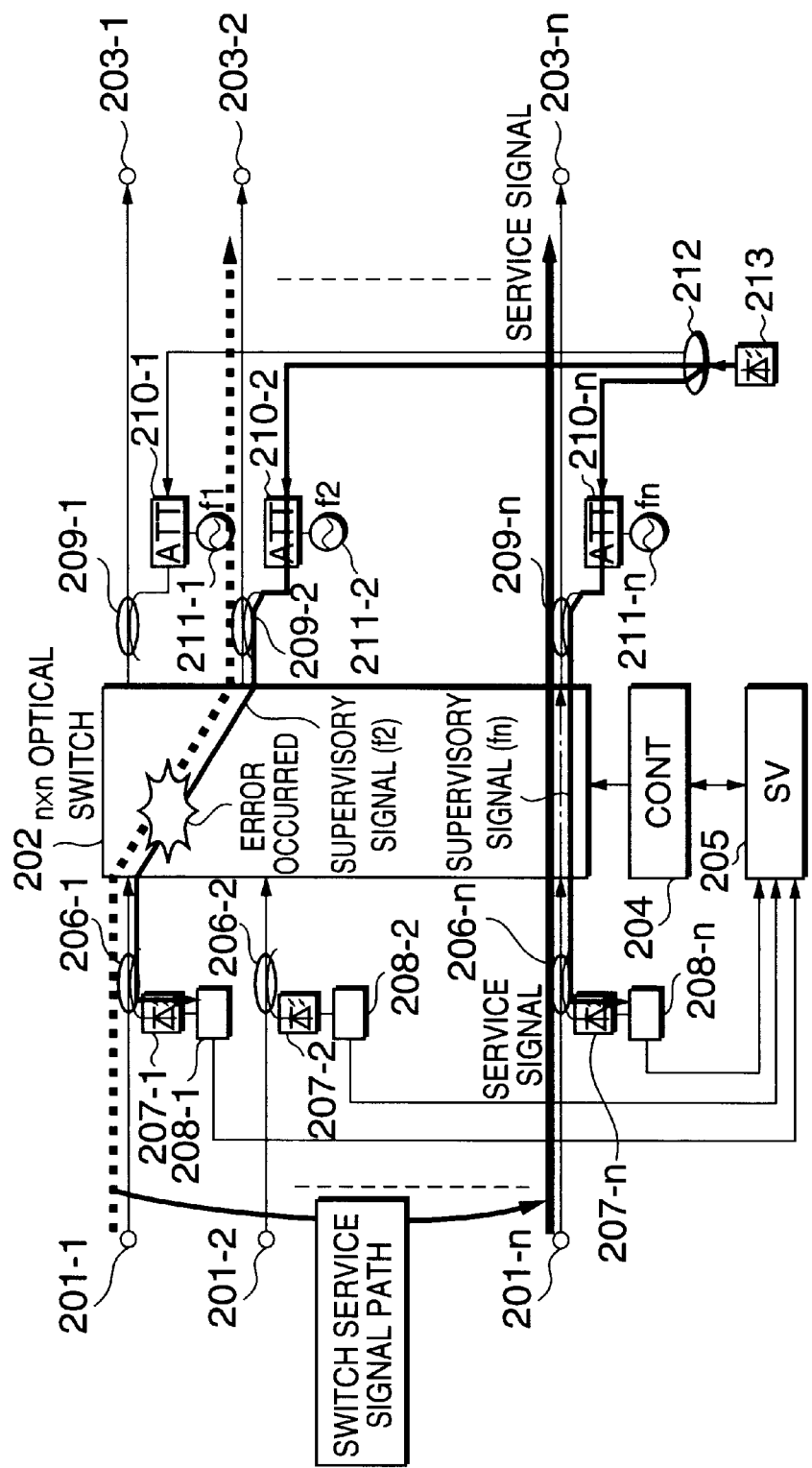
FIG. 16 is a diagram showing the supervisory operation of the third embodiment.

FIG. 16 shows an example of path switching. As shown in FIG. 15, it is necessary to confirm, in advance, that the path "201-n→203-n" operates properly as a standby path. When an error occurs in the service signal passing through the path "201-1→203-2", the signal is switched to the standby path "201-n→203-n". Supervising the standby path as described above increases the reliability of the network.

In this embodiment, the service signal need not be supplied to the n×n optical switch 202 when supervising the optical paths because the supervisory light source is provided as an additional component. Therefore, before the service signal is supplied, the optical path to be used may be checked in advance.

Fourth Embodiment

Figure 17:
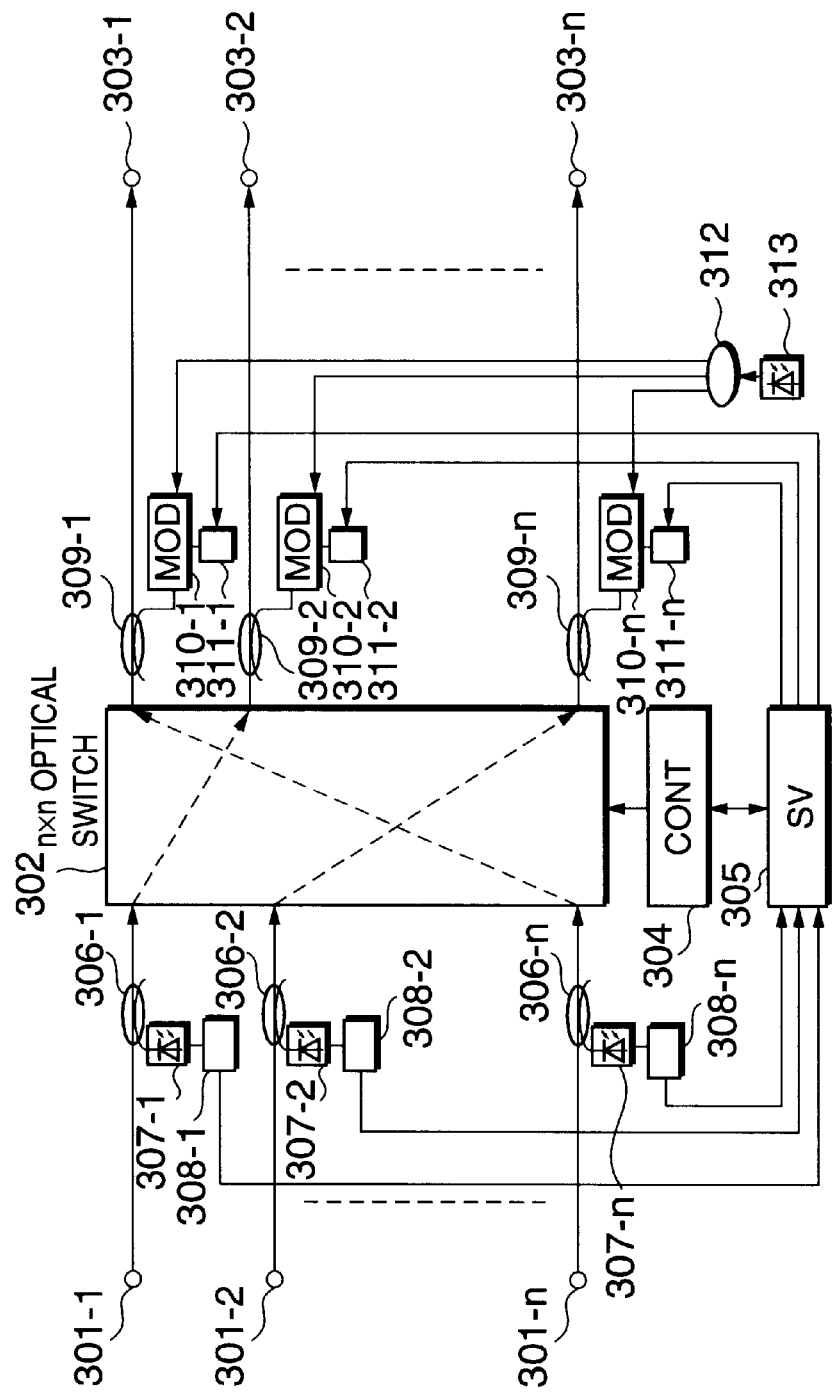
FIG. 17 is a diagram showing the configuration of an optical crossconnect in a fourth embodiment of the present invention.

FIG. 17 shows the configuration of an optical crossconnect in a fourth embodiment of the present invention. The optical crossconnect shown in FIG. 17 comprises optical signal input terminals 301-1–301-n, an n×n optical switch 302, optical signal output terminals 303-1–303-n, optical path control means 304, optical path supervisory means 305, optical couplers 306-1–306-n, photo-diodes 307-1–307-n, supervisory signal detecting means 308-1–308-n, optical couplers 3091–309-n, optical modulators 310-1–310-n, optical modulator driving means 311-1–311-n, a 1:n optical coupler 312, and a supervisory light source 313.

The optical crossconnect in this embodiment is similar to the optical crossconnect in the third embodiment described above except the supervisory signal generating means. The supervisory signal paths in FIG. 17 are the same as those in the third embodiment. However, the supervisory signal is generated by each of the optical modulators 310-1–310-n, which intensity-modulate the light from the supervisory light source 313, using the signal from the optical path supervisory means 305. The supervisory signal detecting means re-generates the intensity-modulated signal and sends the re-generated signal back to the optical path supervisory means 305. The optical path supervisory means 305 checks whether the received signal matches the signal that was sent to determine whether the optical path is normal. Therefore, in this embodiment, the signals, each generated by the optical path supervisory means for each optical path that is set and each different from those of other paths, are used as supervisory signals.

In this embodiment, the service signal need not be supplied to the n×n optical switch 302 when supervising the optical paths because the supervisory light source is provided as an additional component as in the third embodiment. Therefore, before the service signal is supplied, the optical path to be used may be checked in advance.

Fifth Embodiment

Figure 18:
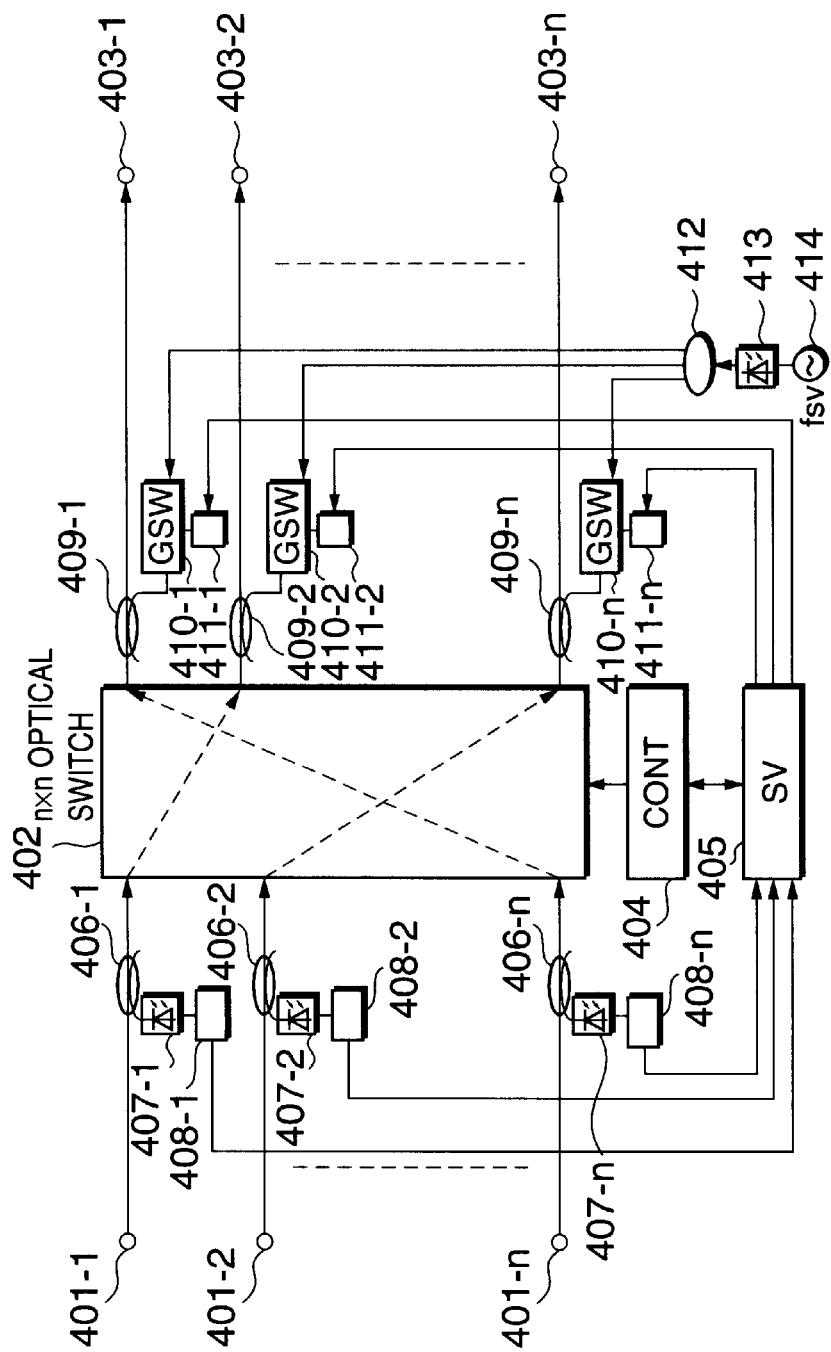
FIG. 18 is a diagram showing the configuration of an optical crossconnect in a fifth embodiment of the present invention.

FIG. 18 shows the configuration of an optical crossconnect in a fifth embodiment of the present invention. The optical crossconnect shown in FIG. 18 comprises optical signal input terminals 401-1–401-n, an n×n optical switch 402, optical signal output terminals 403-1–403-n, optical path control means 404, optical path supervisory means 405, optical couplers 406-1–406-n, photo-diodes 407-1–407-n, supervisory signal detecting means 408-1–408-n, optical couplers 409-1–409-n, optical gate switches 410-1–410-n, gate switch driving means 411-1–411-n, a 1:n optical coupler 412, a supervisory light source 413, and a supervisory signal generating means 414.

The optical crossconnect shown in FIG. 18 is similar to the optical crossconnect in the third embodiment described above except the supervisory signal generating means. The supervisory signal paths in FIG. 18 are the same as those in the third embodiment described above. However, the supervisory signal is generated by intensity-modulating the light from the supervisory light source 413 using the signal from the supervisory signal generating means 414. The supervisory signal distributed to the optical gate switches 410-

Figure 19:
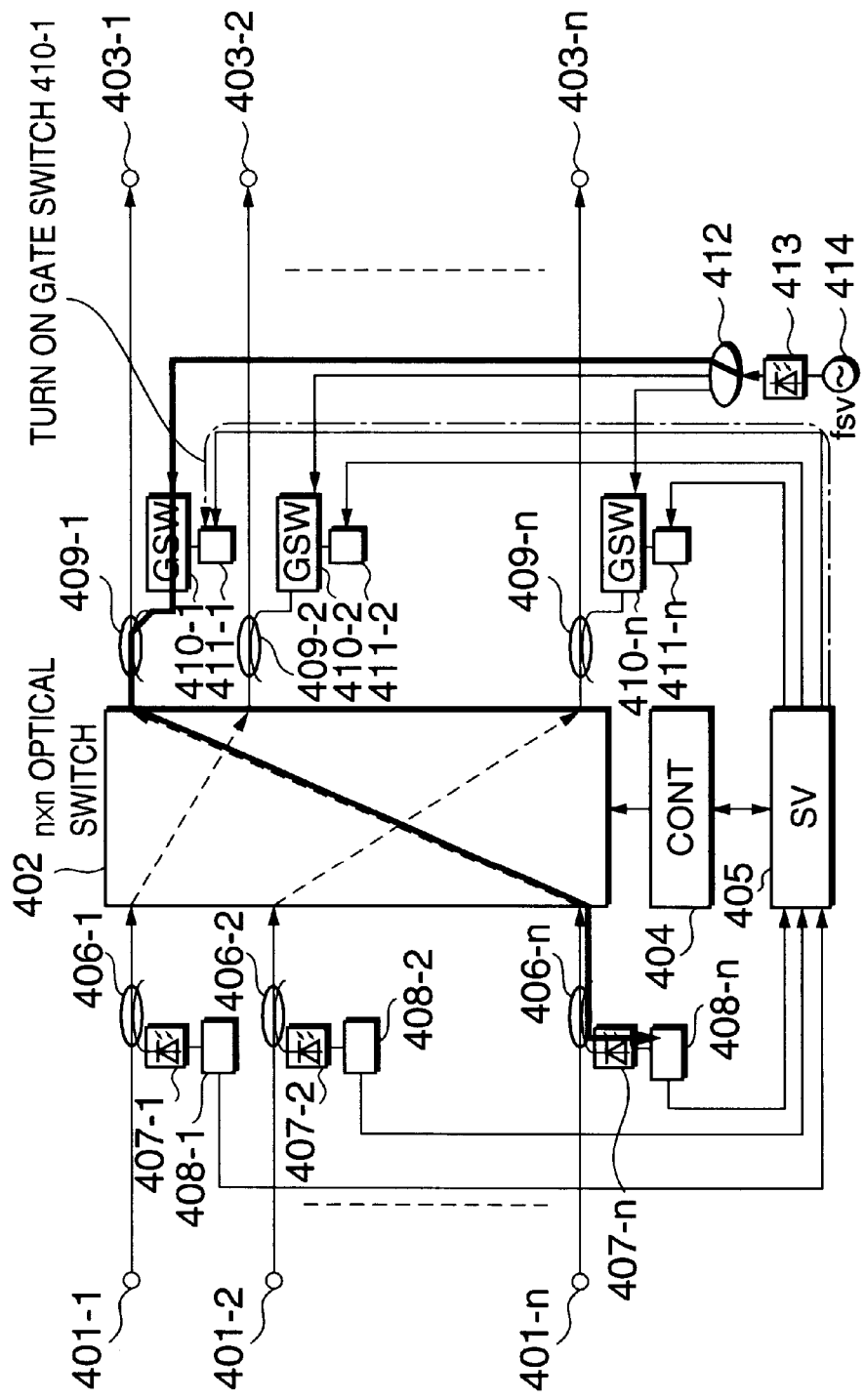
FIG. 19 is a diagram showing the supervisory operation of the fifth embodiment.
Figure 20:
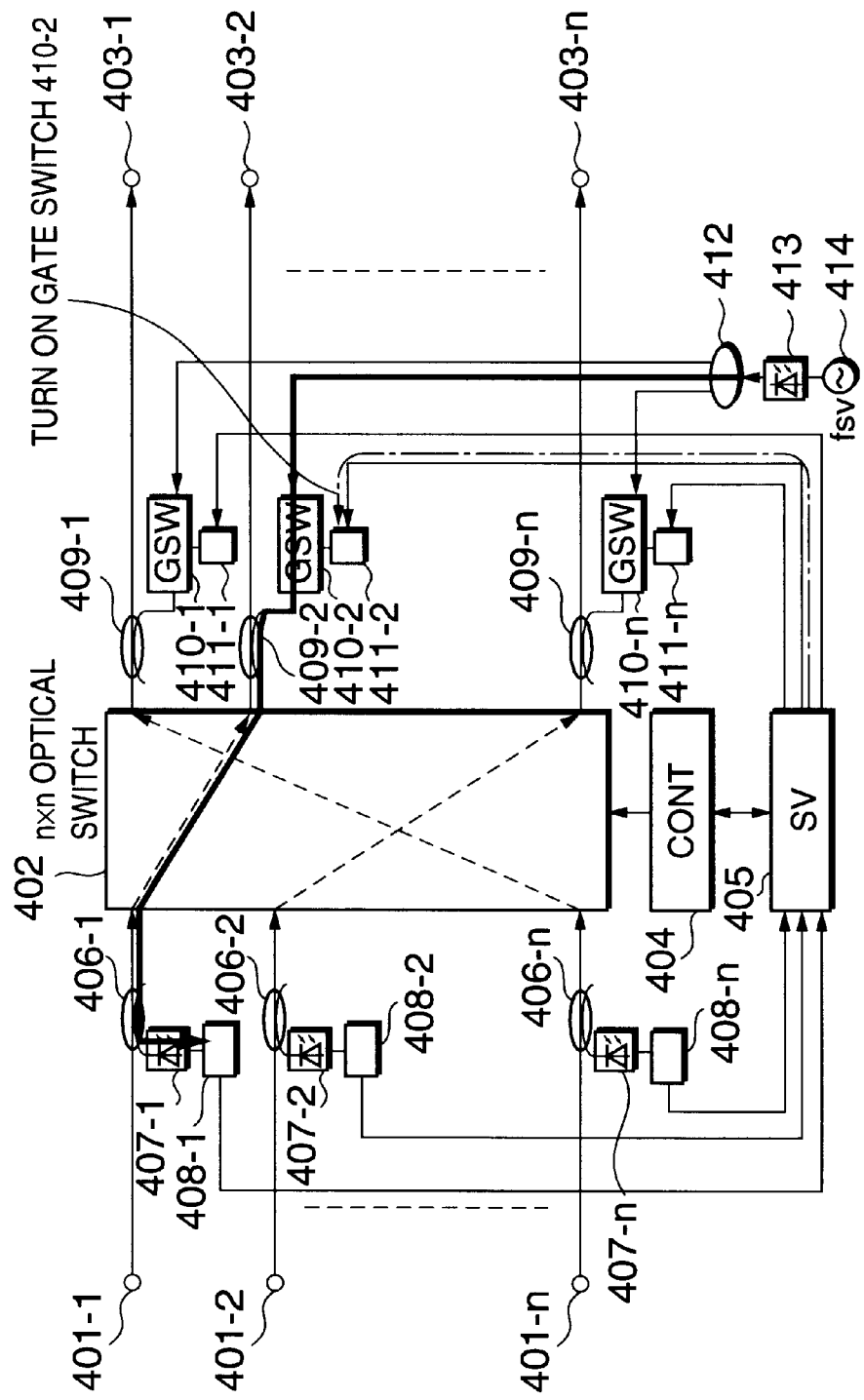
FIG. 20 is a diagram showing the supervisory operation of the fifth embodiment.

1–410-n via the optical coupler 412 passes through one of n gate switches, under control of the optical path supervisory means 405, for supervising the optical path (FIG. 19, FIG. 20). That is, the optical path supervisory means 405 enables only one of the optical gate switches corresponding to the path to be supervised. When the supervisory signal returns from the supervisory signal detecting means, the optical path supervisory means determines that the optical path is normal. By performing this operation for n paths, all paths may be supervised.

As in the third embodiment, the service signal need not be supplied to the n×n optical switch 402 when supervising the optical paths because the supervisory light source is provided as an additional component. Therefore, before the service signal is supplied, the optical path to be used may be checked in advance.

Sixth Embodiment

Figure 21:
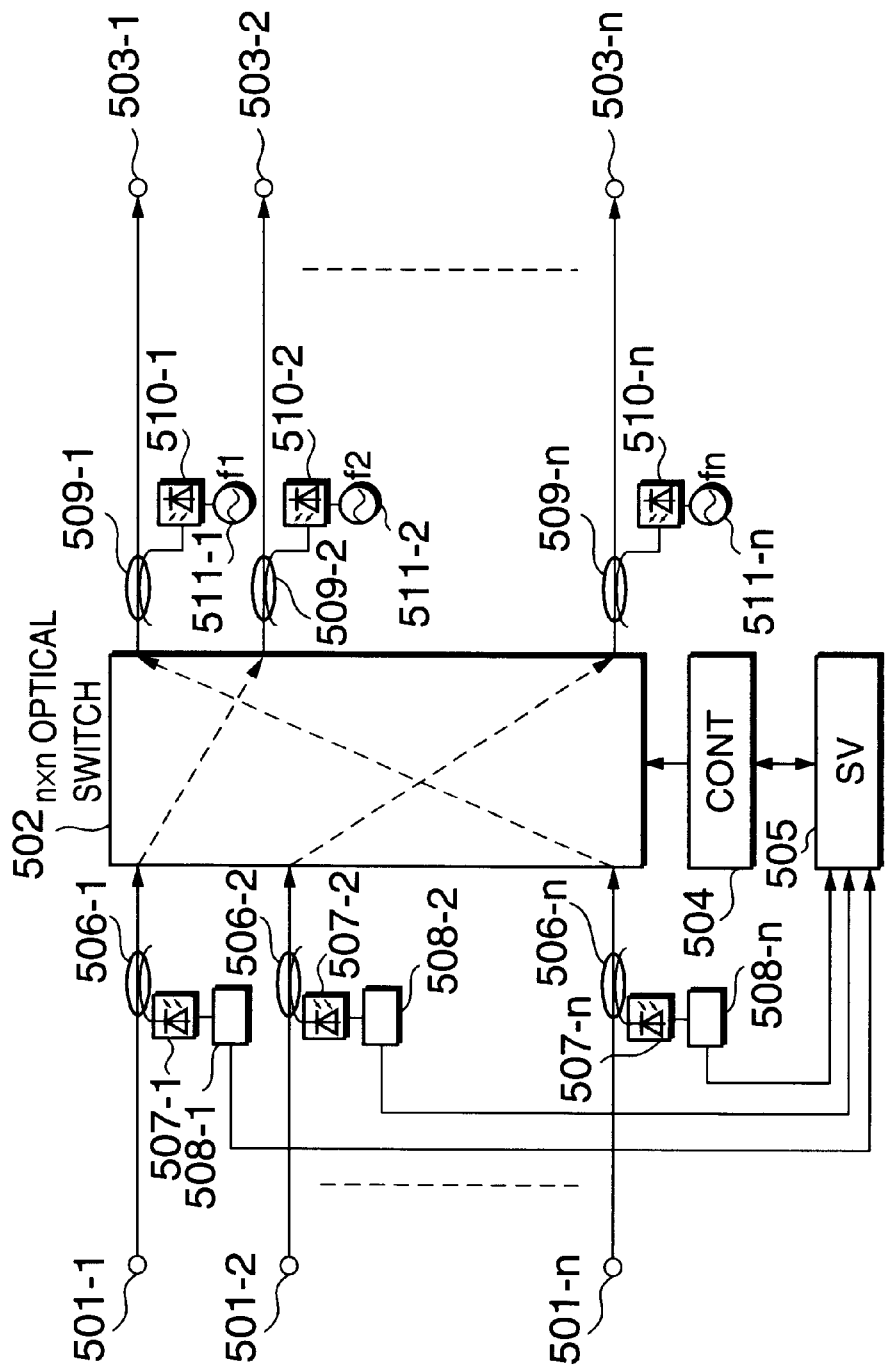
FIG. 21 is a diagram showing the configuration of an optical crossconnect in a sixth embodiment of the present invention.

FIG. 21 shows the configuration of an optical crossconnect in a sixth embodiment of the present invention. The optical crossconnect shown in FIG. 21 comprises optical signal input terminals 501-1–501-n, an n×n optical switch 502, optical signal output terminals 503-1–503-n, optical path control means 504, optical path supervisory means 505, optical couplers 506-1–506-n, photo-diodes 507-1–507-n, supervisory signal detecting means 508-1–508-n, optical couplers 509-1–509-n, supervisory light sources 510-1–510-n, and supervisory signal generating means 511-1–511-n.

The optical crossconnect shown in FIG. 21 is similar to the optical crossconnect in the third embodiment except the supervisory signal generating means. In FIG. 21, the supervisory signal paths are the same as those in the third embodiment. However, in this embodiment, one supervisory light source and one supervisory signal generating means are provided for each output port of the n×n optical switch 502. The supervisory signals are generated by intensity-modulating the light from the supervisory light sources 510-1–510-n using the signal from the supervisory signal generating means 511-1–511-n. Because n supervisory signal generating means 511-1–511-n generate signals with frequencies f1–fn respectively, the supervisory signals are also intensity-modulated by frequencies f1–fn respectively.

Each of the intensity-modulated supervisory signals passes through one of the optical paths of the n×n optical switch 502 in the opposite direction of the service signal. It is sent via the corresponding optical coupler 506-1–506-n and then opto-electric converted by the corresponding photo-diode 507-1–507-n. The supervisory signal is extracted by the supervisory signal detecting means 508-1–508-n and is sent to the optical path supervisory means 505. The optical path supervisory means 505 checks the frequency and the level of each signal detected as the supervisory signal to identify the path through which the optical signal has actually passed as well as the loss. Then, the optical path supervisory means 505 determines whether or not the optical path that is set by the optical path control means 504 is operating normally.

In this embodiment, the service signal need not be supplied to the n×n optical switch 502 when supervising the optical paths because the supervisory light sources are provided as additional components as in the third embodiment. Therefore, before the service signal is supplied, the optical path to be used may be checked in advance.

Seventh Embodiment

Figure 22:
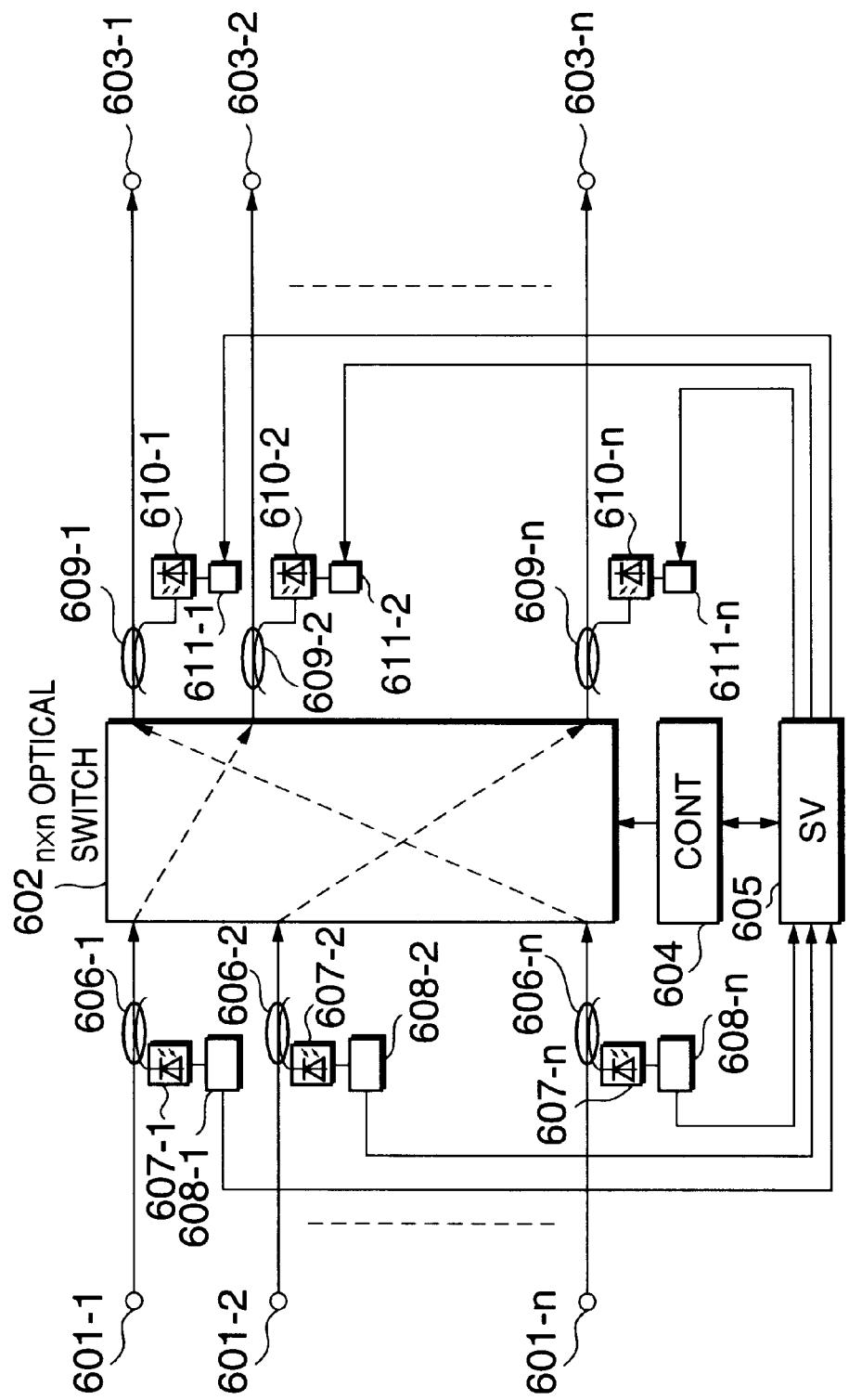
FIG. 22 is a diagram showing the configuration of an optical crossconnect in a seventh embodiment of the present invention.

FIG. 22 shows the configuration of an optical crossconnect in a seventh embodiment of the present invention. The optical crossconnect shown in FIG. 22 comprises optical signal input terminals 601-1–601-n, an n×n optical switch 602, optical signal output terminals 603-1–603-n, optical path control means 604, optical path supervisory means 605, optical couplers 606-1–606-n, photo-diodes 607-1–607-n, supervisory signal detecting means 608-1–608-n, optical couplers 609-1–609-n, supervisory light sources 610-1–610-n, and optical source driving means 611-1–611-n.

The optical crossconnect shown in FIG. 22 is similar to the optical crossconnect in the third embodiment described above except the supervisory signal generating means. In FIG. 22, the supervisory signal paths are the same as those in the third embodiment. However, in this embodiment, one supervisory light source and one supervisory signal generating means are provided for each output port of the n×n optical switch 602. The supervisory signals are generated by intensity-modulating the light from the supervisory light sources 610-1–610-n using the signal from the optical path supervisory means 605.

Each of the intensity-modulated supervisory signals passes through one of the optical paths of the n×n optical switch 602 in the opposite direction of the service signal. It is sent via the corresponding optical coupler 606-1–606-n and then opto-electric converted by the corresponding photo-diode 607-1–607-n. The supervisory signal is re-generated by the supervisory signal detecting means 608-1–608-n and is sent to the optical path supervisory means 605. The optical path supervisory means 605 checks whether the received signal matches the signal that was sent to determine whether the optical path is normal. As described above, the signals, each generated by the optical path supervisory means for each path that is set and each different from those of other paths, are used in this embodiment as supervisory signals.

Again, in this embodiment, the service signal need not be supplied to the n×n optical switch 602 when supervising the optical paths because the supervisory light sources are provided as additional components as in the third embodiment. Therefore, before the service signal is supplied, the optical path to be used may be checked in advance.

In the embodiments described above, the optical couplers (for example, 6-1–6-n) are provided on the input side of the n×n optical switch (for example, 2) to branch the supervisory signal transmitted from the output side into the photo-diodes (for example, 7-1–7-n). It should be noted that the branching of the supervisory signal is not limited to this configuration. For example, the optical couplers 6-1–6-n may be replaced by optical circulators. The use of optical circulators prevents the supervisory signal from leaking into the input side of the optical crossconnect, further improving the transmission characteristics.

Figure 23:
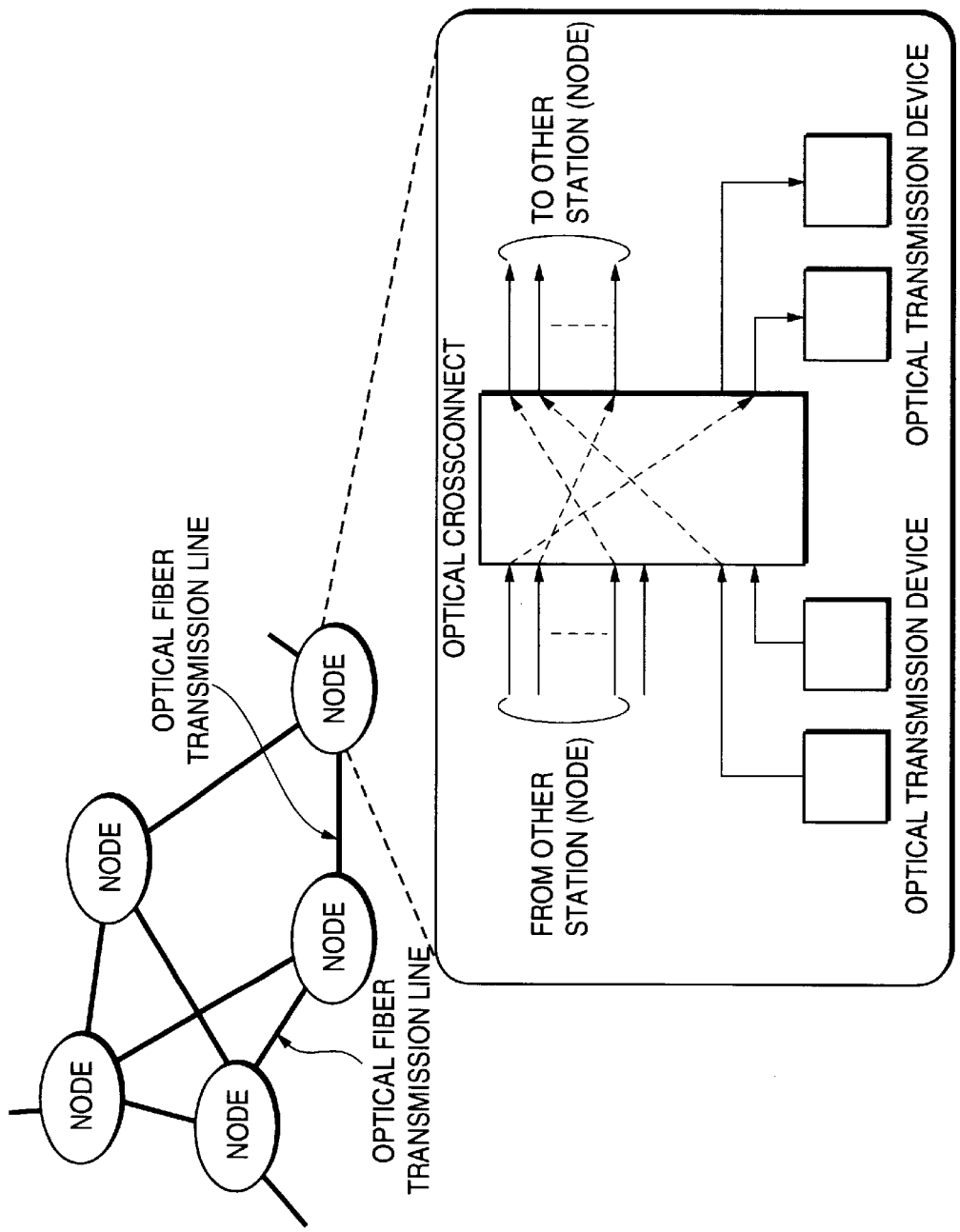
FIG. 23 is a diagram showing an example of the configuration of an optical network using optical crossconnect.

Interconnecting a plurality of optical node devices, each with the optical crossconnect in any of the embodiments described above, via optical transmission lines allows a network shown in FIG. 23 to be built. In this optical network, optical signals are transmitted via stations (optical node devices). For example, in the optical crossconnect in the first embodiment, the optical signal input terminals 1-1–1-n and the optical signal output terminals 3-1–3-n shown in FIG. 6 are each connected to other desired stations (optical node devices). Therefore, setting paths in the n×n optical switch 2 allows any transmission path of an optical signal to be set up.

Figure 24:
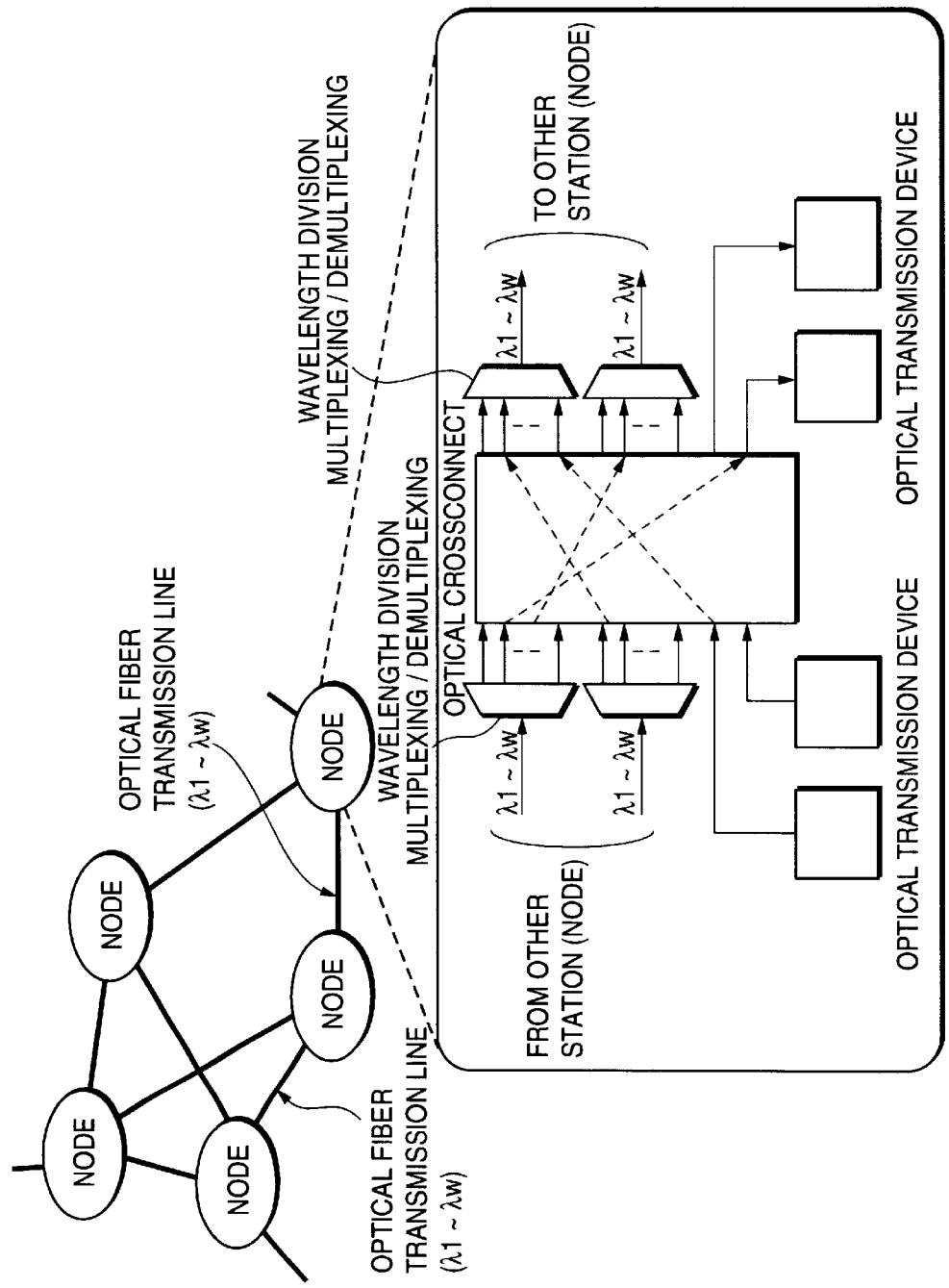
FIG. 24 is a diagram showing an example of the configuration of an optical network using optical crossconnects.

Recently, an optical network using the wavelength-division multiplexing (WDM) technology is being studied. FIG. 24 shows the configuration of an optical network using the WDM technology. In the optical network shown in FIG. 24, optical signals, generated by wavelength-division multiplexing the signals with the wavelength ranging from λ1 to λw, are transmitted between stations (optical node devices). An optical crossconnect in any of the above embodiments may be used as an optical node device of the optical network shown in FIG. 24. The configuration of such an optical node device is shown in FIG. 24. An optical de-multiplexer, which de-multiplexes a wavelength-division multiplexed signal from the optical network into components of various wavelengths, is connected to the input of the optical crossconnect of the optical node device. Also, an optical multiplexer, which multiplexes optical signals of various wavelengths, is connected to the output of the optical crossconnect.

For example, assume that the optical crossconnect in the first embodiment (FIG. 6) is used as the optical node device. In this case, the optical signals with the wavelength ranging from λ1 to λw, which are not yet wavelength-multiplexed, are connected to the optical signal input terminals 1-1–1-n and the optical signal output terminals 3-1–3-n. The transmission path of each optical signal is set by the n×n optical switch 2 on a wavelength basis. Wavelength multiplexed signals are transmitted through transmission lines between the stations (optical node devices). Using wavelength-multiplexed signals with some specific wavelengths for protection purposes improves network reliability.

The present invention has the advantages described below. The optical crossconnect according to the present invention propagates the supervisory signal from the output side to the input side of the optical switch in the opposite direction of the service signal. This supervisory signal is monitored on the input side.

Using the detected supervisory signal, the optical crossconnect checks the path through which the optical signal has actually passed as well as the loss and determines whether or not the optical path that is set by the optical path control means is operating normally. In addition, because no intensity-modulation is performed for the service signal output from the optical crossconnect, there is no concern for quality degradation.

While this invention has been described in connection with certain preferred embodiments, it is to be understood that the subject matter encompassed by way of this invention is not to be limited to those specific embodiments. On the contrary, it is intended for the subject matter of the invention to include all alternatives, modifications, and equivalents as can be included within the spirit and scope of the following claims.

What is claimed is:

1. An optical crossconnect selectively connecting at least one input terminal with at least output terminal, said optical crossconnect comprising:
   an optical switch connecting at least one input port connected to said at least one input terminal with at least one output port connected to said at least one output terminal;
   at least one supervisory light generating circuit for sending a supervisory light from each of said at least one output port to said optical switch; and
   at least one supervisory light receiving, circuit for receiving the supervisory light output from said at least one input port, wherein
      each of said at least one supervisory light generating circuit has an optical reflector that reflects a part of an optical signal output from each of said at least one output port to supply the reflected optical signal to said at least one output port, and
      wherein a reflectivity of said optical reflector varies with said at least one output port.

2. An optical crossconnect selectively connecting at least one input terminal with at least one output terminal said optical crossconnect comprise:
   an optical switch connecting at least one input port connected to said at least input terminal with at least one output port connected to said at least one output terminal;
   at least one supervisory light generating circuit for sending a supervisory light from each of said at least one output port to said optical switch; and
   at least one supervisory light receiving circuit for receiving the supervisory light output from said at least one input port, wherein
      each of said at least one supervisory light generating circuit comprises an optical modulation unit that modulates a part of an output optical signal output from each of said at least one output port and supplies the modulated signal to said at least one output port, and
      wherein a modulation signal applied to said optical modulation unit varies with said at least one output port.

3. An optical crossconnect selectively connecting at least one input terminal with at least one output terminal, said optical crossconnect comprising:
   an optical switch connecting at least one input port connected to said at least one input terminal with at least one output port connected to said at least one output terminal;
   at least one supervisor light generating circuit for sending a supervisor light from each of said at least one output port to said optical switch; and
   at least one supervisory light receiving circuit for receiving the supervisory light output from said at least one input port, wherein
      each of said at least one supervisory light generating circuit comprises an optical modulation unit that modulates a part of an output optical signal output from each of said at least one output port and supplies the modulated signal to said at least one output port,
      wherein a modulation signal applied to said optical modulation unit varies with said at least one output port, and wherein said optical modulation unit comprises:
         an optical modulator; and
         an optical reflector that reflects an output light of said optical modulator and sends the reflected light back to an output side of said optical modulator.

4. An optical crossconnect selectively connecting at least one input terminal with at least one output terminal, said optical crossconnect comprising:
   an optical switch connecting at least one input port connected to said at least one input terminal with at least one output port connected to said at least one output terminal;
   at least one supervisory light generating circuit for sending a supervisory light from each of said at least one output port to said optical switch; and
   at least one supervisory light receiving circuit for receiving the supervisor light output from said at least one input port, wherein each of said at least one supervisory light generating circuit comprises an optical modulation unit that modulates a part of an output optical signal output from each of said at least one output port and supplies the modulated signal to said at least one output port, wherein a modulation signal applied to said optical modulation unit varies with said at least one output port, and wherein said optical modulation unit comprises:

an optical circulator in which the part of output optical signal is input from a first input/output terminal, the light input from the first input/output terminal is output from a second input/output terminal, and the light input from a third input/output terminal is output from the first input/output terminal; and an optical modulator whose input and output are connected to said second input/output terminal and said third input/output terminal.

5. An optical crossconnect selectively connecting at least one input terminal with at least one output terminal, said optical crossconnect comprising:

an optical switch connecting at least one input port connected to said at least one input terminal with at least one output port connected to said at least one output terminal;

at least one supervisory light generating circuit for sending a supervisory light from each of said at least one output to said optical switch; and at least one supervisory light receiving circuit for receiving the supervisory light output from said at least one input port, said optical crossconnect further comprising:

a supervisory light source generating a continuous wave light; and an optical branching unit dividing the continuous wave light into at least one branch continuous wave light, wherein each of said at least one supervisory light generating circuit comprises:

a variable optical attenuator receiving one of said at least one branch continuous wave and supplying an output light to said at least one output port, and wherein an attentuation amount of said variable optical attenuator varies with said at least one output port.

6. An optical crossconnect selectively connecting at least one input terminal with at least output terminal, said optical crossconnect comprising:

an optical switch connecting at least one input port connected to said at least one input terminal with at least one output port connected to said at least one output terminal;

at lest one supervisory light generating circuit for sending a supervisory light from each of said at least one output port to said optical switch; and at least one supervisory light receiving circuit for receiving the supervisory light output from said at least one input port, said optical crossconnect further comprising:

a supervisory light source generating a continuous wave light; and an optical branching unit dividing the continuous wave light into at least one branch continuous wave light, wherein each of said at least one supervisory light generating circuit comprises:

an optical modulator receiving one of said at least one branch continuous wave and supplying an output light to one of said at least one output port, and wherein a modulation signal applied to the optical modulator varies with said at least one output port.

7. An optical crossconnect selectively connecting at least one input terminal with at least one output terminal, said optical crossconnect comprising:

an optical switch connecting at least one input port connected to said at least one input terminal with at least one output port connected to said at least one output terminal;

at least one supervisory light generating circuit for send light from each of said at least one out port to said optical switch; and at least one supervisory light receiving circuit for receiving the supervisory light output from said at least one input port, said optical crossconnect further comprising:

a modulated supervisory light source generating a modulated supervisory light modulated by a predetermined signal; and an optical branching unit dividing said modulated supervisory light into at least one branch modulated supervisory light, wherein each of said at least one supervisory light generating circuit comprises:

an optical gate switch receiving one of said at least one branch modulated supervisory light and supplying an output light to one of said at least one output port, and wherein a switching signal applied to said optical gate switch varies with said at least one output port.

8. An optical crossconnect selectively connecting at least one input terminal with at least one output terminal, said optical crossconnect comprising:

an optical switch connecting at least one input port connected to said at least one input terminal with at least one output port connected to said at least one output terminal;

at least one supervisory generating circuit for sending a supervisory light from each of said at least one output port to said optical switch; and at least one supervisory light receiving circuit for receiving the supervisory light output from said at least one input port, wherein each of said at least one supervisory light generating circuit comprises a supervisory light source generating a modulated supervisory light modulated by a predetermined modulation signal and supplying the generated light to said at least one output port, and wherein said modulation signal is a sine wave signal having a frequency varying with said at least one output port.

9. An optical crossconnect selectively connecting at least one input terminal with at least one output terminal, said optical crossconnect comprising:

an optical switch connecting at least one input port connected to said at least one input terminal with at least one output port connected to said at least one output terminal;

at least one supervisory light generating circuit for sending a supervisory light from each of said at least one output port to said optical switch; and at least on supervisory light receiving circuit for receiving the supervisory light output from said at least one input port, wherein each of said at least one supervisory light generating circuit comprises a supervisory light source generating a modulated supervisory light modulated by a predetermined modulation signal and supplying the generated light to said at least one output port, and wherein said modulation signal varies with said at least one output port.

10. A connection status supervisory method for supervising a connection status of an optical crossconnect, said connection status supervisory method comprising the steps of:

generating a supervisory light to supply it to each of output ports of said optical crossconnect, said supervisory light being superimposed over by a signal that is unique;

receiving the supervisory light output from each of input ports of said optical crossconnect; and determining whether or not an optical path is normal by referencing the signal superimposed over the supervisory light received in the step of receiving the supervisory light, wherein said step of generating a supervisory light comprises the step of modulating a part of an optical signal output from said output port to generate said supervisory light.

* * * * *